(12) United States Patent
Kashima

(10) Patent No.: US 8,577,210 B2
(45) Date of Patent: Nov. 5, 2013

(54) IMAGE EDITING APPARATUS, IMAGE EDITING METHOD AND PROGRAM

(75) Inventor: Koji Kashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 319 days.

(21) Appl. No.: 12/838,997

(22) Filed: Jul. 19, 2010

(65) Prior Publication Data

US 2011/0026901 A1 Feb. 3, 2011

(30) Foreign Application Priority Data

Jul. 29, 2009 (JP) ................................. 2009-176572

(51) Int. Cl.
*H04N 5/93* (2006.01)
(52) U.S. Cl.
USPC .......................................... 386/353; 386/278
(58) Field of Classification Search
None
See application file for complete search history.

(56) References Cited

U.S. PATENT DOCUMENTS

| | | | |
|---|---|---|---|
| 2008/0193099 A1* | 8/2008 | Nakai et al. | 386/52 |
| 2008/0256450 A1* | 10/2008 | Takakura et al. | 715/721 |
| 2009/0142030 A1* | 6/2009 | Lee et al. | 386/52 |
| 2009/0276817 A1* | 11/2009 | Colter et al. | 725/88 |
| 2010/0223649 A1* | 9/2010 | Suitts et al. | 725/105 |
| 2010/0281375 A1* | 11/2010 | Pendergast et al. | 715/723 |

FOREIGN PATENT DOCUMENTS

JP 2004-159331 6/2004

OTHER PUBLICATIONS

"EMediaLive.com: Canopus Announces MPEGcraft DVD", Dec. 19, 2003; <http://www.emedialive.com/Articles/ReadArticle.aspx?ArticleID=8129>.
Canopus Manual of MPEGCraft 3 Dvd; <http://www.thomson-canopus.jp/manual/pdf/mcraft3dvd_users.pdf>, Feb. 16, 2006.

* cited by examiner

*Primary Examiner* — Huy T Nguyen
*Assistant Examiner* — Eileen Adams
(74) *Attorney, Agent, or Firm* — Oblon, Spivak, McClelland, Maier & Neustadt, L.L.P.

(57) ABSTRACT

Method and information processing apparatus for generating an edited work including a subset of a plurality of scenes in an image material. The information processing apparatus includes a memory configured to store the image material including the plurality of scenes. The information processing apparatus further includes a processor configured to select, for an n-th scene of the edited work, a plurality of first candidate scenes from the plurality of scenes based on at least one feature of a preceding (n−1-th) scene of the edited work and features of the plurality of scenes. The processor is also configured to generate a graphical user interface including a scene selection area and a preview area. The scene selection area includes one or more first candidate images corresponding to at least one of the plurality of first candidate scenes, and the preview area includes a preview of the preceding (n−1-th) scene.

19 Claims, 13 Drawing Sheets

IMAGE EDITING APPARATUS, IMAGE EDITING METHOD AND PROGRAM

BACKGROUND OF THE INVENTION

1. Field of the Invention

The present invention relates to an image editing apparatus, an image editing method, and a program.

2. Description of the Related Art

A moving image captured and recorded by an imaging apparatus such as a camcorder includes a scene where an image was not successfully captured or a scene that is unnecessary, and thus the moving image has to be edited to make it look smooth-running. For this purpose, various editing application software for editing a moving image in an editing apparatus such as a personal computer (PC) or the like have been developed.

However, for a user who is not used to editing a moving image, there are obstacles relating to an editing environment and an editing skill, and thus, the editing application mentioned above can hardly be said to be widely used. For example, the obstacle relating to the editing environment may be that selection of a PC and an editing application suitable for the PC is difficult, that a PC has to be of a high specification, or that learning of application operation is bothersome. Also, the obstacle relating to the editing skill may be that a task of selecting a position at which a scene in a moving image is to be divided, of selecting or deleting a scene, of connecting a plurality of scenes, or of specifying an image switching effect to be applied between scenes is difficult.

Therefore, various PC applications have been developed for automatic editing of a moving image. Among these, according to a fully automatic editing application, a user can achieve an edit result of a moving image by simply specifying a moving image to be edited and a desired template. For example, JP-A-2004-159331 discloses an automatic editing application that calculates the importance of a sub-shot that is extracted from a video and generates a video summary according to the importance.

However, according to the fully automatic editing application, a user is not allowed to adjust a moving image that has been automatically adjusted, and a desired piece of work might not be obtained. Accordingly, an application that allows adjustment to be made to a moving image that has been automatically edited is also developed. For example, "VAIO de kantan! Suteki na movie wo tsukuttemiyo!," [online], Sony Corporation, [searched on Jul. 16, 2009], Internet <URL: http://vcl.vaio.sony.co.jp/support/special/appl/dvd-_howto05-4.html> discloses an automatic editing application capable of adding a new scene to or deleting a scene from a moving image that has been automatically edited by an application or of rearranging the order of scenes by a user operation.

SUMMARY

However, according to the editing application described above which allows adjustment after the automatic editing, a user has to perform, after the automatic editing, user operation of checking the necessity of multiple scenes and switching or adding each scene, and thus there is still a room for improvement of the operating system. Also, it is not able to present a user with a plurality of recommended scenes that may be suitably linked after a certain scene.

The present invention addresses the above-identified issues, and enables a user to be presented with a plurality of candidate scenes that may be suitably linked after a certain scene at the time of adjustment of an automatically edited image work, and also enables the user to easily produce an image work that is to the user's liking by a simple operating system.

According to an exemplary embodiment, an information processing apparatus is provided for generating an edited work including a subset of a plurality of scenes in an image material. The information processing apparatus includes a memory and a processor. The memory is configured to store the image material including the plurality of scenes. The processor is configured to select, for an n-th scene of the edited work, a plurality of first candidate scenes from the plurality of scenes based on at least one feature of a preceding (n−1-th) scene of the edited work and features of the plurality of scenes, and to generate a graphical user interface including a scene selection area, which includes one or more first candidate images corresponding to at least one of the plurality of first candidate scenes, and a preview area, which includes a preview of the preceding (n−1-th) scene.

Further, according to another exemplary embodiment, a method is provided for generating an edited work including a subset of a plurality of scenes in an image material. The method includes storing the image material including the plurality of scenes. A plurality of first candidate scenes from the plurality of scenes are selected by a processor of the information processing apparatus, for an n-th scene of the edited work, based on at least one feature of a preceding (n−1-th) scene of the edited work and features of the plurality of scenes. Further, a graphical user interface is generated by the processor of the information processing apparatus. The graphical user interface includes a scene selection area, which includes one or more first candidate images corresponding to at least one of the plurality of first candidate scenes, and a preview area, which includes a preview of the preceding (n−1-th) scene.

Further, according to another exemplary embodiment, a non-transitory computer-readable storage medium is provided for generating an edited work including a subset of a plurality of scenes in an image material. The non-transitory computer-readable storage medium stores instructions, which when executed by a processor, causes the processor to store the image material including the plurality of scenes. A plurality of first candidate scenes from the plurality of scenes are selected by a processor of the information processing apparatus, for an n-th scene of the edited work, based on at least one feature of a preceding (n−1-th) scene of the edited work and features of the plurality of scenes. Further, a graphical user interface is generated by the processor of the information processing apparatus. The graphical user interface includes a scene selection area, which includes one or more first candidate images corresponding to at least one of the plurality of first candidate scenes, and a preview area, which includes a preview of the preceding (n−1-th) scene.

DETAILED DESCRIPTION OF THE EXEMPLARY EMBODIMENT(S)

Figure 1:
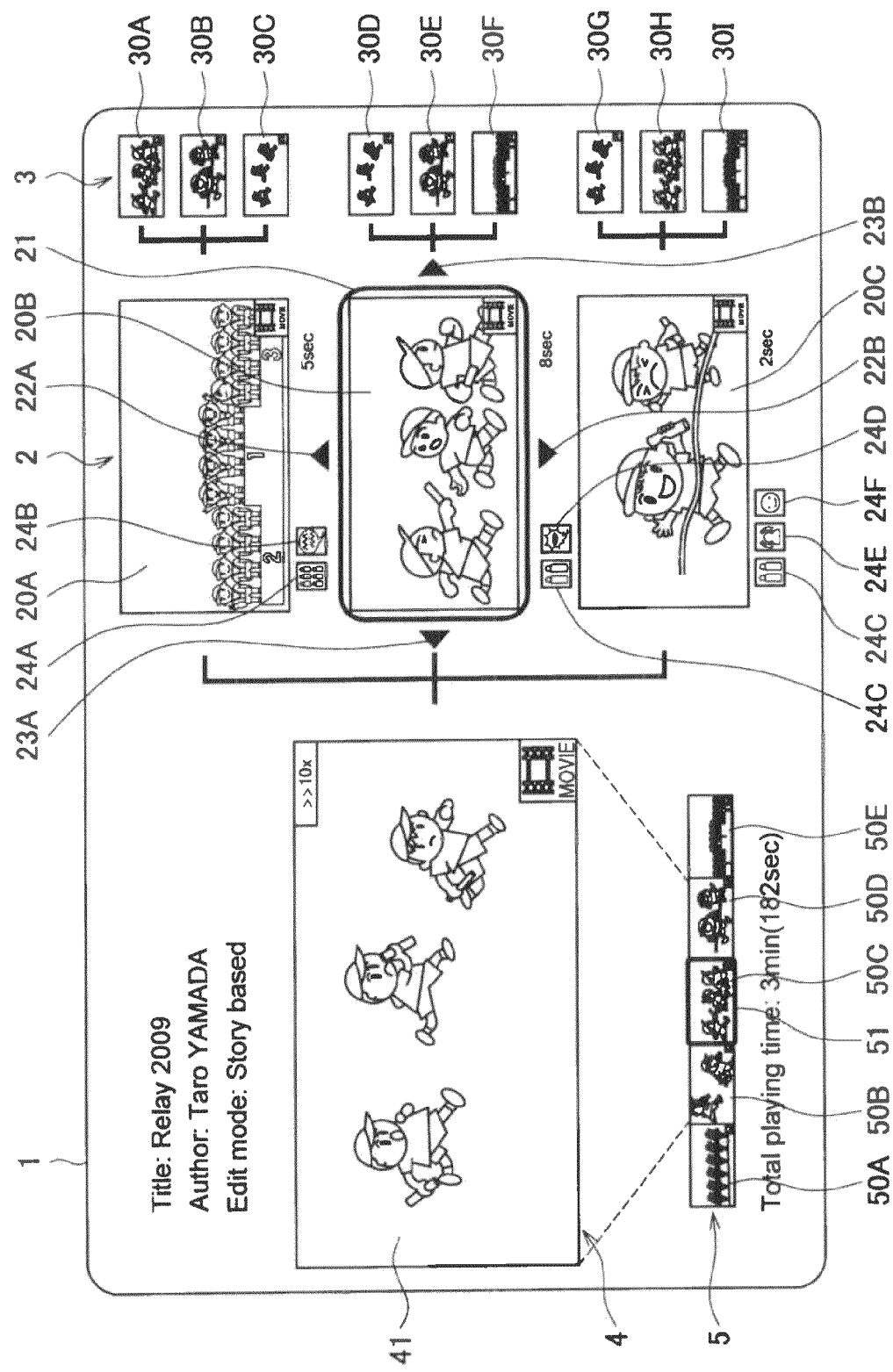
FIG. 1 is a diagram showing an example of display of an edit screen according to an exemplary embodiment of the present invention.

Hereinafter, preferred exemplary embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Additionally, description will be made in the order shown below.

1. Outline of Editing Method
2. Example of Display of Edit Screen
3. Hardware Configuration of Image Editing Apparatus
4. Functional Configuration of Image Editing Apparatus
5. Image Editing Method
6. Application Example
7. Summary <1. Outline of Editing Method>

First, an outline of an image editing method of an image editing apparatus according to the first exemplary embodiment of the present exemplary embodiment will be described.

The image editing apparatus according to the present exemplary embodiment includes an automatic edit function of automatically editing an image material based on a feature (attribute) of the image material, and a manual adjustment function of adjusting, according to a user input, an image work that has been produced by the automatic editing to complete the edited work.

The image material here is image data formed from moving images or still images. For example, the image material is image data that has been captured and recorded by an imaging apparatus, such as a digital camcorder, a digital still camera or the like, but it may also be image data created by image processing, such as CG (computer graphics), an illustration or the like. Furthermore, the edited work is the result of editing the image material, i.e. image data that is obtained by editing one or more image materials. Additionally, in the present specification, an image includes a moving image and a still image. Also, a scene is a part or all of the sections of a moving image. The scene is a unit for editing to be used at the time of editing a moving image.

With the automatic editing function, the image editing apparatus analyses an image material and obtains the feature of the image material, and based on the feature, divides a moving image in the image material into a plurality of scenes. Then, based on the features of these plurality of scenes, the image editing apparatus extracts appropriate scenes from the plurality of scenes, arranges these extracted scenes in an appropriate order, and automatically produces an edited work. Such an automatic editing function enables the automatic creation of an appropriate edited work according to the feature of the image material, and thus convenience of a user can be achieved.

With the manual adjustment function, the image editing apparatus displays an edit screen for the edited work created by the automatic editing function, and adds or deletes a scene to/from the edited work that has been automatically edited or rearranges the order of the scenes. Such manual adjustment function enables a user to easily modify the edited work that has been automatically edited to an edited work (an edit result) that is to the user's liking, and thus the quality of the edited work can be improved.

As described above, the image editing apparatus according to the present exemplary embodiment uses the automatic editing function and the manual adjustment function to edit an image material and produce an edited work desired by a user. At the time of manual adjustment, the image editing apparatus presents on an edit screen a plurality of candidates (candidate scenes) for scenes that may be suitably linked after a certain scene. Accordingly, a user can produce an edited work that is desirable to the user by sequentially selecting from the beginning scenes that are to the user's liking among the plurality of candidate scenes presented on the edit screen. As described, the image editing apparatus according to the present exemplary embodiment has its characteristic in providing a user interface (edit screen) having an extremely simple operation and which enables a user to easily produce an edited work that is to the user's liking.

<2. Example of Display of Edit Screen>

Next, the outline of an edit screen 1 of the image editing apparatus according to the present exemplary embodiment will be described with reference to FIG. 1. FIG. 1 is a diagram showing an example of display of the edit screen 1 of the image editing apparatus according to the present exemplary embodiment.

As shown in FIG. 1, the edit screen 1 is a GUI (Graphical User Interface) screen for a user to manually adjust an edited work that has been automatically edited by the image editing apparatus. The edit screen 1 is displayed on a display device (not shown) of the image editing apparatus by application software that is installed in the image editing apparatus. A user can check the outline of the edited work that has been automatically edited by looking at the edit screen 1, and also, can perform manual editing such as addition/deletion/rearrangement of a plurality scenes making up the edited work.

As described above, based on the feature of one or more image materials, the image editing apparatus automatically edits the one or more image materials into an edited work by dividing a moving image in the one or more image materials into a plurality of scenes and combining appropriate scenes among the plurality of scenes in an appropriate order. The edited work that has been automatically edited in this manner is made up of a combination of images of a plurality of scenes extracted from the one or more image materials. By performing specific operation while looking at the edit screen 1, a user can adjust (reedit) the edited work that has been automatically edited to a work that is to the user's liking by deleting an unnecessary scene in the edited work, by adding a new scene thereto, or by changing the order of the scenes. The edit screen 1 is a GUI that enables a user to perform such manual editing by a simple operation.

In the following, the configuration of the edit screen 1 will be described in detail. Additionally, in the following, a case will be described where an edited work that has been generated by the automatic editing is made up of m scenes (m is any integer that is 2 or more) and where a user selects, on the edit screen 1, m scenes that make up the edited work, one by one from the beginning. The edited work is a final result of editing obtained by automatically and manually editing an image material.

As shown in FIG. 1, the edit screen 1 includes, on one screen, a scene selection area 2, a next-scene display area 3, a preview area 4, and a roll film area 5. Each area on the edit screen 1 will be described in detail below.

First, the scene selection area 2 will be described. The scene selection area 2 is an area that displays a plurality of candidate scenes 20A to 20C, which are the candidates for a scene n-th from the beginning of the edited work, and that are used by a user to manually select one candidate scene from the plurality of candidate scenes 20A to 20C. In the example shown, the scene selection area 2 is arranged approximately in the middle of the edit screen 1, and images of three candidate scenes 20A, 20B and 20C are arranged in a vertical direction in the scene selection area 2. Additionally, the number of candidate scenes to be presented in the scene selection area 2 is not limited to three as in FIG. 1, and any arbitrary number (for example, two or four or more) of candidate scenes 20 may be presented. Also, the image of the candidate scene 20 may be a moving image or a still image as long as it is at least a part of the reproduction image of the candidate scene 20. For example, only the candidate scene 20B that is currently selected by a cursor 21 may be made to be a moving image, and other candidate scenes 20A and 20C may be still images.

The image editing apparatus automatically selects as the candidates for an n-th scene of the edited work a specific number of candidate scenes 20 which may be suitably linked after a preceding scene (n−1-th scene), based on the feature of each scene of an image material. At this time, the image editing apparatus obtains the recommendation level for each candidate scene 20 for the n-th scene based on the feature of each scene of the image material and based on the relationship between the feature of each scene and the feature of the n−1-th scene, and automatically selects a specific number (for example, three) of candidate scenes 20 sequentially from the highest recommendation level. The images of a plurality of candidate scenes 20 that are automatically selected in this manner are displayed in the scene selection area 2 in accordance with the order of recommendation level. In the example shown, the candidate scene 20B displayed in the middle in the vertical direction has the highest recommendation level, and the candidate scene 20A on the top has the next highest recommendation level, followed by the candidate scene 20C on the bottom.

As described, a plurality of candidate scenes 20 that may be suitably linked after the preceding scene (n−1-th scene) are presented in the scene selection area 2 on the edit screen 1. This enables a user to easily select the candidate scene 20B that is to the user's liking as the n-th scene of the edited work by looking only at a specific number of candidate scenes 20A to 20C that are recommended.

The cursor (indicator) 21 displayed in the scene selection area 2 is a tool for selecting one candidate scene from the candidate scenes 20A to 20C. A candidate scene 20B specified by the cursor 21 indicates the candidate scene that is currently selected in the scene selection area 2. A user selects the candidate scene 20B that is to the user's liking from the candidate scenes 20A, 20B and 20C presented in the scene selection area 2 by moving the cursor 21 up and down by pressing an up button 22A or a down button 22B.

Additionally, by pressing left/right buttons 23A and 23B of the cursor 21, an image switching effect to be applied between the candidate scene 20 (n-th scene) that is currently selected and scenes to be connected before and after the candidate scene 20 (n−1-th and n+1-th scenes) can be set. The details of the setting of this image switching effect will be described later.

Furthermore, an icon 24 is displayed near each candidate scene 20 in the scene selection area 2 as information indicating the feature of the candidate scene 20. Here, the information indicating the feature of the candidate scene 20 is information indicating the reason why the candidate scene 20 is recommended. A picture according to the feature of each candidate scene 20 is shown in the icon 24.

For example, an icon 24A indicates that the candidate scene 20A is a scene with a "large number of people," and an icon 24B indicates that the candidate scene 20B is a scene including a "speaking voice". Also, icons 24C indicate that the candidate scenes 20B and 20C are scenes with "small number of people," and an icon 24D indicates that the candidate scene 20B is a scene including a "laughing voice". Also, an icon 24E indicates that the candidate scene 20C is a scene including a "blurred image," and an icon 24F indicates that the candidate scene 20C is a scene including a "smiling face".

As described, the icon 24 indicating the feature (recommendation reason) of the candidate scene 20 is displayed in the scene selection area 2 in association with the candidate scene 20. This enables a user to easily grasp the feature and the recommendation reason of a candidate scene 20 by referring not only to the image of the candidate scene 20 but also to the icon 24.

As described above, in the scene selection area 2, a plurality of candidate scenes 20A to 20C that are recommended as the n-th scene of the edited work are presented, and the candidate scene that is to the user's liking is selected from the candidate scenes 20A to 20C. As this selection operation, the user may set the cursor 21 to a desired candidate scene 20B and press a determination button not shown, for example. Additionally, in the example shown, a state is shown where a third scene from the beginning of the edited work is selected (n=3). After the selection of the third scene (for example, the candidate scene 20B) is completed, images of the candidates for the fourth scene (for example, candidate scenes 30D, 30E, and 30F) are displayed in the scene selection area 2 so as to be selectable.

Next, the next-scene display area 3 will be described. The next-scene display area 3 is an area for displaying, for respective candidate scenes 20 for the n-th scene, a plurality of candidate scenes 30A to 30I for the n+1-th scene of the edited work as the candidates for the n+1-th scene from the beginning of the edited work. In the example shown, the next-scene display area 3 is arranged at the right side of the edit screen 1, and three groups of candidate scenes 30A to 30C, 30D to 30F, and 30G to 30I, nine scenes in total, are arranged in a vertical direction in the next-scene display area 3. Additionally, the image of the candidate scene 30 may be a moving image or a still image as long as it is at least a part of the reproduction image of the candidate scene 30. However, when considering the visibility of the edit screen 1, the image of the candidate scene is preferably a still image.

In the next-scene display area 3, the candidate scenes 30A to 30I are displayed each in association with one of the candidate scenes 20A to 20C that are for the n-th scenes displayed in the scene selection area 2. In the example shown, a plurality (for example, three) of candidate scenes 30A to 30C, 30D to 30F, and 30G to 30I are respectively associated with the candidate scene 20A, 20B, and 20C. The candidate scenes 30A to 30C are candidates for a scene that may be suitably linked after the candidate scene 20A, the candidate scenes 30D to 30F are candidates for a scene that may be suitably linked after the candidate scene 20B, and the candidate scenes 30G to 30I are candidates for a scene that may be suitably linked after the candidate scene 20C. Additionally, the number of the candidate scenes 30 to be presented in the next-scene display area 3 for each candidate scene 20 is not limited to three as in FIG. 1, and an arbitrary number (for example, one, two, or four or more) of candidate scenes 30 may be presented.

The image editing apparatus automatically selects, as the candidate for the n+1-th scene of the edited work, the candidate scene 30 (n+1-th scene) that may be suitably linked after the preceding scene (n-th scene) for each of the candidate scenes 20A, 20B and 20C for the n-th scenes, based on the feature of the image material. At this time, as in the case of the candidate scenes 20 for the n-th scene described above, the image editing apparatus obtains the recommendation level for each candidate scene 30 for the n+1-th scene based on the feature of each scene of the image material and based on the relationship between the feature and the feature of the candidate scene 20 for the n-th scene, and automatically selects a specific number (for example, three) of candidate scenes 30 sequentially from the highest recommendation level. Then, the image editing apparatus displays in the next-scene display area 3 the candidate scenes 30 selected for each of the candidate scenes 20A, 20B and 20C.

In the example shown, three candidate scenes, 30D, 30E and 30F, are recommended as the candidate for the scene (n+1-th scene) following the candidate scene 20B (n-th scene), and among these, the recommendation level for the candidate scene 30E arranged in the middle is the highest. That is, in the example shown, it can be seen that, at the time point of selecting the n-th scene of the edited work in the scene selection area 2, the candidate scenes for the n-th and the n+1-th scenes with the highest recommendation levels are the candidate scene 20B and the candidate scene 30E.

As described above, the recommended candidate scenes 30A to 30I that may be suitably linked after the preceding candidate scenes 20A to 20C are presented in the next-scene display area 3 on the edit screen 1 for the candidate scenes 20A to 20C for the preceding scene (n-th scene). This enables a user to select any of the candidate scenes 20A to 20C that is to the user's liking in the scene selection area 2 while referring to the candidate scenes 30A to 30I in the lower level that are presented for the candidate scenes 20A to 20C in the upper level and while considering the correlation between scenes of the edited work.

Additionally, in the example of the edit screen 1 of FIG. 1, the candidate scene for the n-th scene that is currently selected and the candidate scene 30 for the next n+1-th scene are presented in a tree structure with two layers, but it is not limited to such example, and the candidate scenes may be presented in a tree structure with three or more layers, for example.

Next, the preview area 4 will be described. The preview area 4 is an area for previewing a connecting part of the candidate scene that is selected in the scene selection area 2 (n-th scene of the edited work) and the candidate scenes before and after the selected scene (including at least the n-1-th and n+1-th scenes). More specifically, the preview area 4 displays a playback moving image 41 of the connecting part of the candidate scene 20B (n-th scene) that is selected in the scene selection area 2, the candidate scene (not shown) for the preceding scene (n-1-th, n-2-th, . . . ), and the candidate scene 30E for the following scene (n+1-th, n+2-th, . . . ).

The candidate scene 20B here that is selected in the scene selection area 2 is the candidate scene that is currently selected by the user (that is, the candidate scene specified by the cursor 21) among the plurality of candidate scenes 20A to 20C that are displayed in the scene selection area 2. Furthermore, the candidate scene of the scene preceding the candidate scene 20B (n-th scene) that is selected is one or more candidate scenes that are arranged before the candidate scene for the n-th scene in the edited work, and includes at least the candidate scene (not shown) for the n-1-th scene. In case the time length of the n-1-th candidate scene is shorter than a specific time, the candidate scene for the preceding scene may further include candidate scenes for n-2-th, n-3-th, . . . scenes. Accordingly, a moving image of a scene of a specific time before the candidate scene for the n-th scene will be displayed in the preview area 4. Furthermore, the candidate scene following the candidate scene 20B (n-th scene) that is selected is one or more candidate scenes arranged after the candidate scene for the n-th scene, and includes at least any of the candidate scenes 30A to 30I for the n+1-th scene. In case the time length of the n+1-th candidate scene is shorter than a specific time, the candidate scene for the following scene may further include candidate scenes for n+2-th, n+3-th, . . . scenes. Accordingly, a moving image of a scene of a specific time after the candidate scene for the n-th scene will also be displayed in the preview area 4. In the example shown, the following candidate scene is the candidate scene 30E for which the recommendation level as the next scene following the candidate scene 20B is the highest among the candidate scenes 30A to 30I for the n+1-th scene. At the time point of selection for the n-th scene in the scene selection area 2, the preceding n-1-th scene is decided but the following n+1-th scene is not yet decided. After selecting the n-th scene, the n+1-th scene is selected from the candidate scenes 30A to 30I in the next-scene display area 3.

Furthermore, the connecting part mentioned above may be the whole of the candidate scene 20B (n-th) that is selected, the preceding candidate scene (n-1-th, n-2-th, . . . ), and the following candidate scene (n+1-th, n+2-th, . . . ), or it may be parts of these candidate scenes (for example, only the joining portions of these candidate scenes and surroundings thereof). Additionally, the scene to be displayed in the preview area 4 may be only the candidate scene 20B that is selected and the preceding candidate scene, or may be only the candidate scene 20B that is selected and the following candidate scene. Furthermore, during selection of the first scene (n=1) of the edited work, only the candidate scenes for the first and second scenes are displayed in the preview area 4. In contrast, during selection of the candidate scene (n=m) for the last scene of the edited work, only the candidate scenes for the n-1-th and m-th scenes are displayed in the preview area 4.

With the preview area 4 as described above, the playback moving image 41 which is the connecting part, played back at high speed (for example, 10×), of the candidate scene 20B that is selected in the scene selection area 2 and the candidate scenes for the preceding and following scenes is repeatedly displayed (high-speed preview). Furthermore, when the candidate scene 20B that is selected is changed to the candidate scene 20A in the scene selection area 2, the candidate scene 20A after the change, the candidate scene for the preceding scene and the candidate scene 30B for the following scene are previewed in the preview area 4 at high speed.

By such preview area 4, the relationship (continuity) between the scene that a user is paying attention to and the preceding and following scenes can be presented by displaying the playback moving image 41, which is the scene that is currently selected and an image over a specific range (for example, several minutes) before and after the scene that are played back at high speed. Accordingly, the user can repeatedly check the continuity between the scene that is selected and the preceding and following scenes by the playback moving image 41, and thus the state of correlation between the scene that is selected and the preceding and following scenes and the acceptability of the overall structure can be promptly and appropriately checked. As described, for a user to immediately grasp the contexts before and after the scene that is selected, it is best that the playback moving image 41 is previewed at high speed in the preview area 4. However, the playback speed of the preview area 4 may be any playback speed as long as no inconvenience is caused for a user to grasp the playback moving image 41. For example, if the playback image is short in its entirety, the playback speed of the preview area 4 may be a normal playback speed or a slow playback speed. From this viewpoint, although the image editing apparatus automatically plays back the image displayed in the preview area 4 at an optimum playback speed, a user is also enabled to select a desired playback speed. Also, the playback speed of the preview area 4 is not limited to be a constant playback speed, and it may also be a variable speed. For example, the image editing apparatus may fast forward a boring scene in the playback moving image 41.

Next, the roll film area 5 will be described. The roll film area 5 is an area for displaying, in a roll film format, thumbnail images 50A to 50E of the first to the m-th scenes making up the edited work that is automatically edited. The roll film format is a format of chronologically displaying side by side the thumbnail image (still image) of each section of a moving image. The thumbnails of m scenes making up the edited work whose recommendation levels by the automatic editing are the highest are displayed chronologically in this roll film area 5. The "m" here indicates the total number of scenes making up the edited work, and m is equal to or larger than n.

In the example of FIG. 1, the edited work is made up from five scenes (m=5). The thumbnail 50A on the left end is the thumbnail image of the first scene (n=1) of the edited work, and the thumbnail 50E on the right end is the thumbnail image of the last scene (n=m) of the edited work. Furthermore, a cursor (indicator) 51 is attached to the thumbnail 50C, which is the third from the left in the roll film area 5. This cursor 51 indicates the position of the n-th scene (the third scene from the beginning) that is selected in the scene selection area 2.

Furthermore, when a user moves the cursor 21 in the scene selection area 2 and changes the selection of the candidate scene 20, the thumbnail 50 of the later candidate scene in the roll film area 5 is also dynamically changed according to the changed selection of the candidate scene 20. That is, when the candidate scene 20 for the n-th scene that is selected in the scene selection area 2 (i.e. that is specified by the cursor 21) is changed from 20B to 20A, the recommended candidate scenes for the n+1-th and later scenes (n+1-th to m-th scenes) are also changed. Accordingly, in case there is a selection change for the candidate scene 20 in the scene selection area 2, the thumbnails 50C to 50E of the n-th and later scenes (n-th to m-th scenes) are dynamically changed, among the thumbnail images 50A to 50E displayed in the roll film area 5. In this case, the thumbnail images 50C to 50E are dynamically changed to the thumbnail image of the candidate scene 20A for the n-th scene after the selection change and the thumbnail images of the candidate scenes 30B of the n+1-th and later scenes corresponding to the candidate scene 20A.

With the roll film area 5 as described above, the overall picture of the edited work that is being edited or the outline of each scene of the edited work can be presented to a user in an easily understandable manner. Furthermore, in accordance with the selection change for the candidate scene 20 in the scene selection area 2, the thumbnail images 50 of the candidate scene and the later scenes in the roll film area 5 are also dynamically changed. Accordingly, a user can select a candidate scene that is to the user's liking in the scene selection area 2 while referring to the overall picture of the edited work displayed in the roll film area 5.

Heretofore, the edit screen 1 of the present exemplary embodiment has been described with reference to FIG. 1. According to the edit screen 1 of the present exemplary embodiment, a plurality of candidate scenes 20 that may be suitably linked after a preceding scene are automatically presented in the scene selection area 2 as the recommended images for each scene of the edited work. Accordingly, a user can edit an image material including a moving image or a still image by simply selecting, sequentially from the first scene of the edited work, a desired scene from a plurality of candidate scenes 20 presented in the scene selection area 2. Thus, a user can easily produce an image work that is to the user's liking by an extremely simple operation.

Furthermore, not only the scene selection area 2 but also the next-scene display area 3, the preview area 4 and the roll film area 5 are displayed on the edit screen 1. Accordingly, a user can appropriately and efficiently produce an edited work that is to the user's liking while referring to the images in these areas.

Particularly, the thumbnails 50 of the edit result that is most recommended by the automatic editing are shown side by side in the roll film area 5. Also, the images shown side by side along the horizontal line in the middle of the edit screen 1 (the candidate scene 20B and the candidate scene 30E in FIG. 1) also reflect the edit result that is most recommended by the automatic editing. By presenting the most recommended edit result on the edit screen 1 in this manner, even the scene selection becomes unnecessary as long as the user is satisfied with the edit result. Furthermore, when the user selects a candidate scene 20, the candidate scenes in the lower levels are also dynamically changed in the roll film area 5 and the next-scene display area 3. Accordingly, the user can easily grasp the relationship between the scene that is currently selected and the preceding and following scenes, and thus can select an appropriate candidate scene with clear determination criteria in mind.

<3. Hardware Configuration of Image Editing Apparatus>

Figure 2:
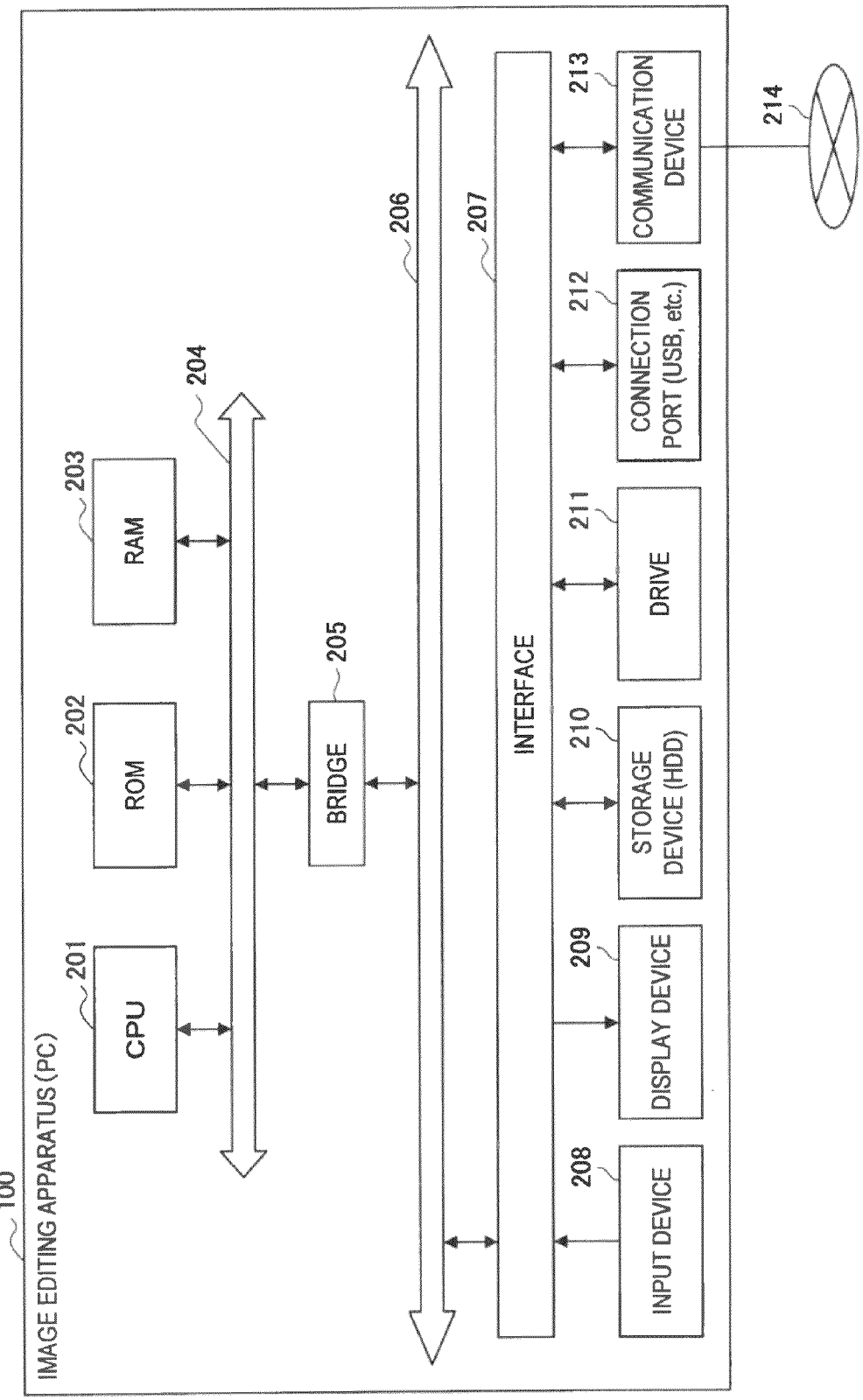
FIG. 2 is a block diagram showing a hardware configuration of an image editing apparatus according to an exemplary embodiment.

Next, the hardware configuration of an image editing apparatus 100 according to the present exemplary embodiment will be described with reference to FIG. 2. FIG. 2 is a block diagram showing the hardware configuration of the image editing apparatus 100 according to the present exemplary embodiment.

As shown in FIG. 2, the image editing apparatus 100 includes a CPU 201, a ROM 202, a RAM 203, a host bus 204, a bridge 205, an external bus 206, and an interface 207, for example. Also, the image editing apparatus 100 includes an input device 208, a display device 209, a storage device (HDD) 210, a drive 211, a connection port 212, and a communication device 213. As described, the image editing apparatus 100 is configured by using a general-purpose computer device (for example, a PC), for example.

The CPU 201 functions as an arithmetic processing apparatus and a control apparatus, operates according to various programs, and controls each unit in the image editing apparatus 100. The CPU 201 performs various kinds of processing in accordance with a program stored in the ROM 202 or a program loaded from the storage device 210 to the RAM 203. The ROM 202 stores the program and arithmetic parameters used by the CPU 201 and functions as a buffer to reduce accesses to the storage device 210 from the CPU 201. The RAM 203 temporarily stores the program used by the CPU 201 when it performs the processing and the parameters and the like that change as appropriate during the performance. These are connected to each other by the host bus 204 configured from a CPU bus or the like. The host bus 204 is connected to the external bus 206 such as a peripheral component interconnect/interface (PCI) bus via the bridge 205.

The input device 208 includes, for example, operation means such as a mouse, a keyboard, a touch panel, a button, a switch, or a lever, and an input control circuit that generates an input signal and outputs it to the CPU 201. The display device 209 is configured from, for example, a liquid crystal display (LCD), an organic EL display, a plasma display, a cathode ray tube (CRT) display, or the like. Furthermore, it is equipped also with a sound output device (not shown) such as a speaker.

The storage device 210 is used to store various kinds of data and is configured from, for example, an external or a built-in disk drive such as a HDD. The storage device 210 drives a hard disk, which is a recording medium, and stores the program executed by the CPU 201 and various kinds of data. The drive 211 is used to carry out read and write operations to the recording medium and is built in or externally attached to the image editing apparatus 100. The drive 211 performs write/read operations of various kinds of data to a removable recording medium such as, for example, a magnetic disc, an optical disc, a magneto-optical disc, or a semiconductor memory loaded into the image editing apparatus 100.

The connection port 212 is used to connect an external peripheral device and has a connection terminal such as, for example, a USB or an IEEE1394. The connection port 212 is connected to the CPU 201 or the like via the interface 207, the external bus 206, the bridge 205, the host bus 204 and the like. The communication device 213 is a communication interface configured from, for example, a communication device or the like for connecting to a network 214. The communication device 213 transmits and receives various kinds of data to and from an external device having network communication functions, via the network 214.

For example, the image editing apparatus 100 can acquire an image material (a moving image or a still image) from an imaging apparatus having network communication functions or other devices via the network 214. The image editing apparatus 100 can also acquire the image material via the recording medium in which the image material is recorded by an imaging apparatus.

<4. Functional Configuration of Image Editing Apparatus>

Figure 3:
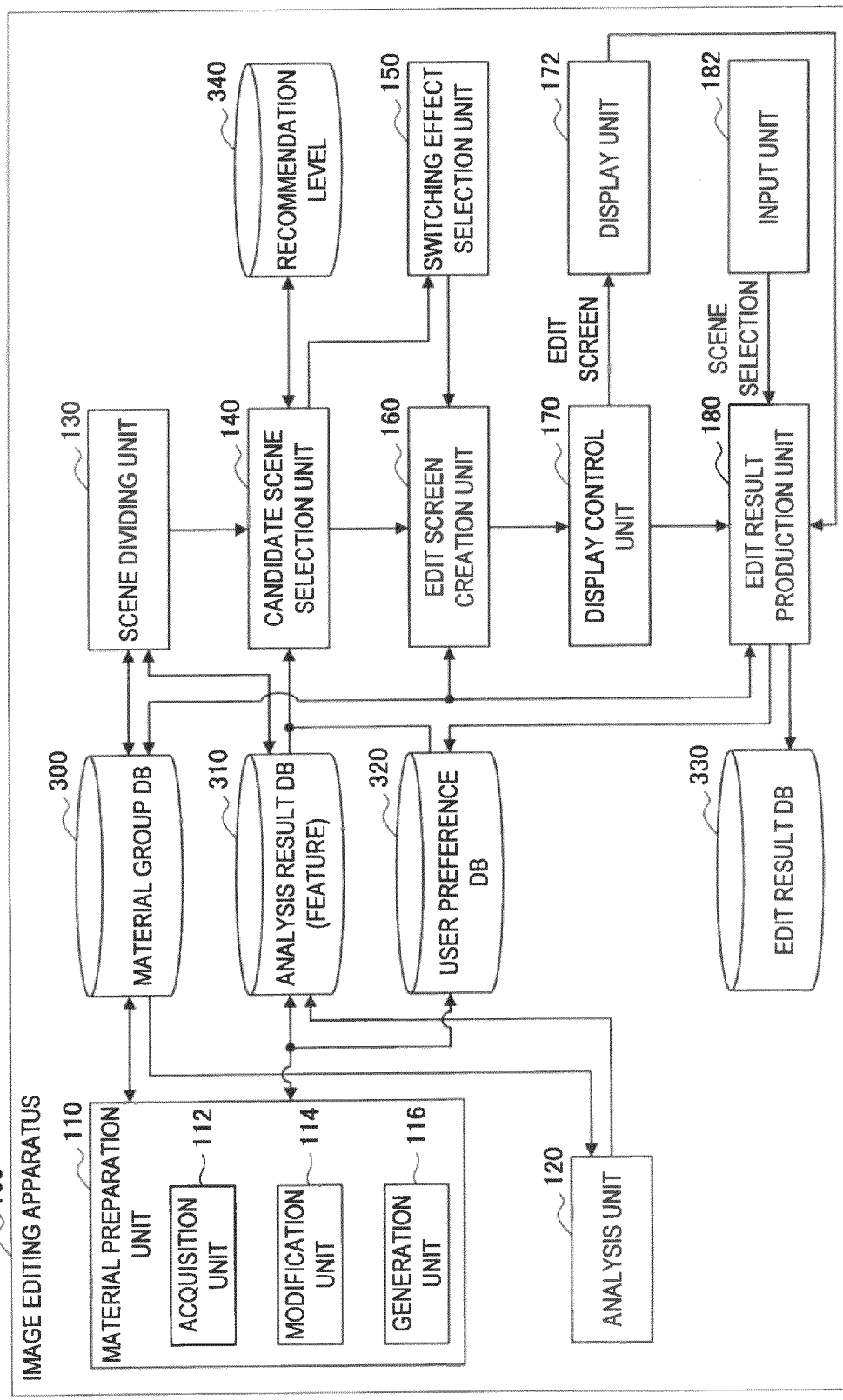
FIG. 3 is a block diagram showing a functional configuration of the image editing apparatus according to an exemplary embodiment.

Next, the functional configuration of the image editing apparatus 100 according to the present exemplary embodiment will be described with reference to FIG. 3. FIG. 3 is a block diagram showing the functional configuration of the image editing apparatus 100 according to the present exemplary embodiment.

As shown in FIG. 3, the image editing apparatus 100 includes a material preparation unit 110, an analysis unit 120, a scene dividing unit 130, a candidate scene selection unit 140, a switching effect selection unit 150, an edit screen creation unit 160, a display control unit 170, a display unit 172, an edit result production unit 180, and an input unit 182. Also, the image editing apparatus 100 includes a storage unit (not shown), and the storage unit stores a material group database 300, an analysis result database 310, a user preference database 230, and an edit result database 330. Among the structural elements mentioned above, the material preparation unit 110, the analysis unit 120, the scene dividing unit 130, the candidate scene selection unit 140, the switching effect selection unit 150, the display control unit 170, and the edit result production unit 180 are realized by application software installed in the image editing apparatus 100, for example. That is, the CPU 201 shown in FIG. 2 executes the functions of these units by operating according to programs stored in the ROM 202 and the like. Additionally, the programs are provided to the image editing apparatus 100 via a recording medium or a network.

The material preparation unit 110 prepares an edit material such as a moving image, a still image, sound or the like, that is to be the edit target of the image editing apparatus 100. The edit material includes, other than an image material such as a moving image or a still image, materials such as audio data, text data and the like. The material preparation unit 110 includes an acquisition unit 112, a modification unit 114, and a generation unit 116.

The acquisition unit 112 acquires the edit material from an external apparatus. For example, the acquisition unit 112 receives, via a network, an image material from an imaging apparatus that captured the image of the image material. Or, the acquisition unit 112 reads out an image material from a removable recording medium (for example, an optical disk, a memory card, or the like) in which the image material was recorded by the imaging apparatus.

The modification unit 114 generates a material (modified material) which is an edit material whose quality is improved, by modifying an edit material of poor quality. The generation unit 116 generates a new material (generated material) by processing an edit material. The modified material and the generated material will be described later.

The analysis unit 120 obtains the feature of the edit material (including the feature of the image material) by analyzing the edit material stored in the material group database 300, and stores the feature in the analysis result database 310. For example, the analysis unit 120 detects the feature of the image material by analyzing a moving image, a still image or audio data included in the image material or by analyzing information (camera setting value, image capturing time, data amount, or the like) attached to the image material. The feature of the image material is information indicating an attribute of the image material, and is information of various kinds of parameters that are quantified to indicate the feature of the image material. The feature of the image material will be a reference that is used when dividing a moving image in the image material into a plurality of scenes or when selecting an optimum candidate scene by the automatic editing.

Figure 4:
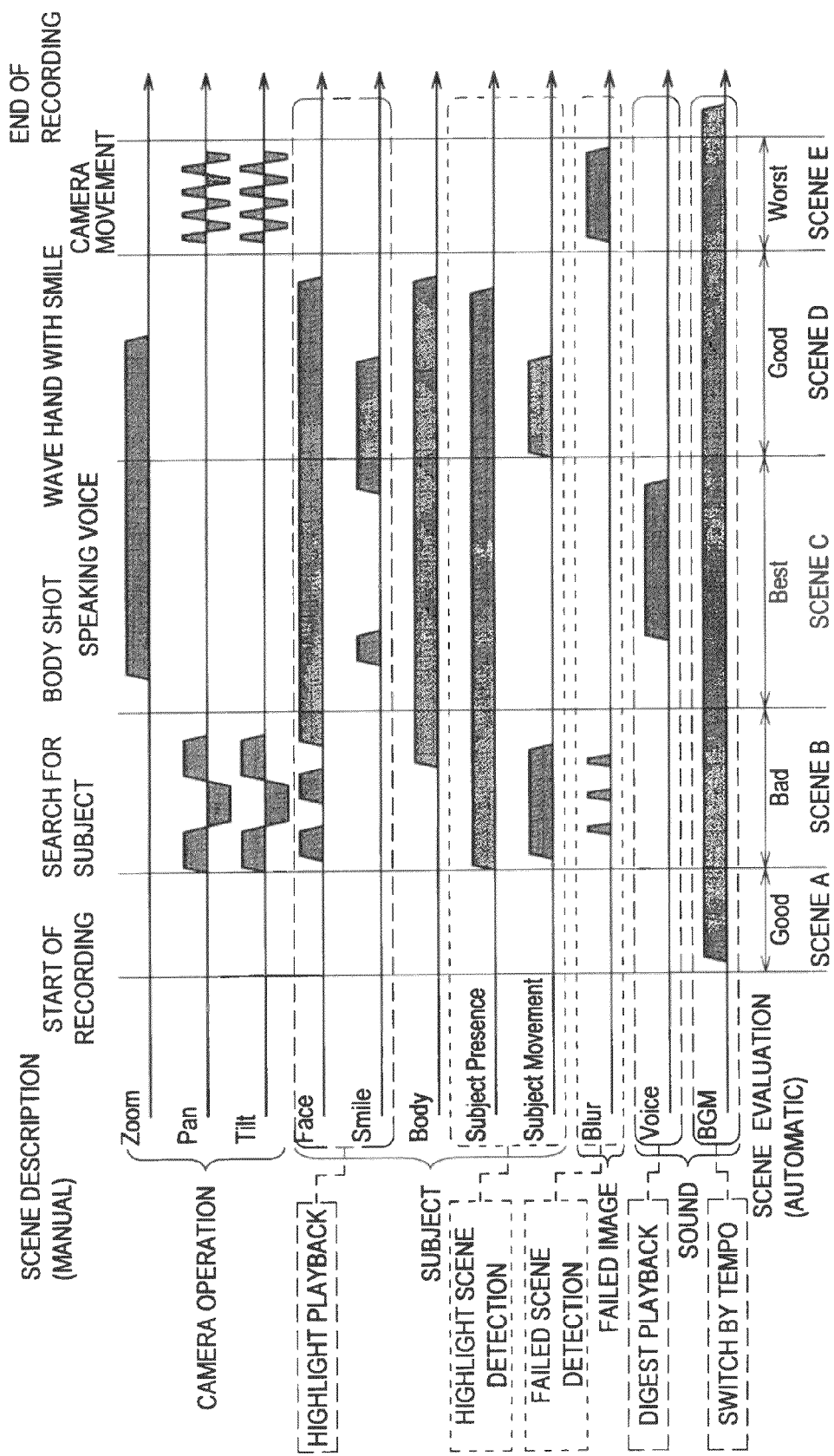
FIG. 4 is a diagram showing examples of features of an image material according to an exemplary embodiment.

FIG. 4 shows examples of the features of the image material according to the present exemplary embodiment. The features shown in FIG. 4 are obtained by analyzing a moving image captured by a camcorder by one image capturing operation.

As shown in FIG. 4, the features of the image material may relate to the operation of the camera (zooming, palming, tilting, hand blur, or the like), a subject appearing in the moving image, an image which was unsuccessfully captured, sound, and the like, for example.

The feature relating to a subject appearing in the moving image indicates the presence/absence of the subject, the movement of the subject, the presence/absence of a part (for example, the face, the body) of the subject (person), the expression (a smile) of the subject, or the like. The face or the smile of the subject can be detected by using a known face detection technology or a known smile detection technology. Also, the presence/absence or the movement of the subject can be detected by a focused subject detection and tracking technology based on the Visual Attention technology. This enables the detection of a highlight scene in which a focused subject is not making any movement.

Also, the feature relating to a failed image indicates that image capturing was unsuccessful due to an image being out of focus, due to a hand blur, or the like, and that the image quality is poor. The failed image can be detected by a failed scene detection technology that uses blur/out-of-focusness of an image based on the Wavelur technology. Furthermore, the feature relating to sound indicates the presence/absence or the tempo of the sound (speaking voice, environmental sound, BGM such as music or the like) recorded during capturing of a moving image.

As shown in FIG. 4, by analyzing an image material, various kinds of features relating to the image material can be obtained, and the changes in these features along the time axis can be obtained. Such temporal change in the features indicates transition between scenes in a moving image. Accordingly, one moving image can be divided into a plurality of scenes based on the various kinds of features.

Accordingly, the scene dividing unit 130 shown in FIG. 3 divides an image material into a plurality of scenes based on the feature of the image material stored in the analysis result database 310. The scene dividing unit 130 detects dividing positions of a plurality of scenes making up one moving image by comprehensively assessing the various kinds of features in combination with each other according to the purpose of the editing, and divides the moving image into a plurality of scenes. Furthermore, the scene dividing unit 130 evaluates whether each scene is acceptable or not based on the feature of the scene that is obtained by dividing the moving image.

In the example of FIG. 4, one moving image is divided into five scenes A to E. Scene A is a stable, good scene where, although there is no appearance of the subject, there is no failed image nor hand blur (Good scene). In contrast, scene B is a scene captured while searching for the subject with a camera, and there is a hand blur because the camera is being moved, and also the subject is moving, and thus the face of the subject is not properly captured, and a part of the scene is decided to be a failed image (Bad scene). Furthermore, scene C is the best scene that includes no blur due to the movement of the camera, includes a smile of the subject, and in which a speaking voice of the subject is recorded (Best scene). Also, scene D is not as good as scene C in that the subject is moving and there is no speaking voice, but otherwise it is a good scene (Good scene). In contrast, scene E is the worst scene for which there is much hand blur and in which the subject does not make appearance (Worst scene).

The candidate scene selection unit 140 selects, based on the features of the image material, a plurality of candidate scenes that are to be the candidates for the n-th scene in the edited work among the scenes divided by the scene dividing unit 130. The candidate scene is the candidate scene 20 for the n-th scene that is to be presented in the scene selection area 2 on the edit screen 1 described above, and is a recommended scene that may be suitably linked after the preceding n−1-th scene. The candidate scene selection unit 140 selects a specific number of candidate scenes as the candidates for the n-th scene among a plurality of scenes of the image material by using feature stored in the analysis result database 310 and user preference information stored in the user preference database 320 described later. The candidate scene selection unit 140 sequentially selects a plurality of candidate scenes that are to be the candidates for the first to m-th scenes of the edited work starting from the first scene, in accordance with the user operation on the edit screen 1.

As an example of the candidate scene selection method, a method of selecting the candidate scenes for the n-th scene based on the recommendation levels calculated from the features will be described. As the method of selecting the candidate scenes for the n-th scene for the scene selection area 2, a method that uses the recommendation level for each scene and a method that uses the recommendation level for the entire automatic editing result can be conceived, for example.

First, the method that uses the recommendation level 340 for each scene will be described. The candidate scene selection unit 140 obtains the recommendation level for a scene as the candidate for the n-th scene based on the feature of the scene of the image material and based on the relationship between the feature of the scene and the feature of the n−1-th scene. Then, the candidate scene selection unit 140 selects, as the candidate scenes for the n-th scene, a specific number of scenes for which the recommendation levels are high from among the plurality of scenes of the image material. The recommendation level is a parameter indicating the degree of recommendation for the candidate scene that may be suitably linked after the preceding scene (n−1-th scene), and is calculated based on the importance of the scene or the relationship to the preceding scene. The calculation method of the recommendation level will be described later in detail.

By quantifying and obtaining the recommendation level for each scene and comparing the recommendation levels in this manner, the candidate scenes for the n-th scene that may be suitably linked after the n−1-th can be appropriately selected.

Next, the method that uses the recommendation level for the entire automatic editing result will be described. According to this method, a plurality of patterns of automatic editing result are produced, the recommendation level for each automatic editing result is obtained, and the candidate scenes for the n-th scene are selected.

More particularly, the candidate scene selection unit 140 first creates a plurality of patterns of automatic editing result by combining at least a part of the scenes among a plurality of scenes obtained by dividing an image material in an arbitrary order. For example, when there are scenes A, B, and C, 15 patterns of automatic editing result will be created (A, B, C, A+B, B+A, A+C, C+A, B+C, C+B, A+B+C, A+C+B, B+A+C, B+C+A, C+A+B, C+B+A). The automatic editing result is an edited work that is automatically created by the automatic editing function of the image editing apparatus 100. Additionally, the automatic editing result may be a plurality of scenes arranged in a chronological order or it may be a plurality of scenes shuffled in a random manner regardless of the chronological order.

Next, the candidate scene selection unit 140 obtains, based on the feature of a scene that is obtained by dividing the image material and based on the relationship between the feature of the scene and the feature of the preceding scene, each of the recommendation levels for the plurality of patterns of automatic editing result. The recommendation level here is a parameter indicating the degree of recommendation for the automatic editing result, and becomes high or low depending on the feature of each scene or the relationship between the features of the scenes before and after. For example, even in a case of producing automatic editing results by combining the same five scenes A to E, the recommendation levels for the automatic editing results will be different depending on the order of arrangement of the scenes. The automatic editing result whose recommendation level is the highest among the plurality of patterns of automatic editing result is presented on the initial edit screen 1 as the most recommended automatic editing result.

Then, the candidate scene selection unit 140 selects, based on the recommendation level for each of the automatic editing results described above, a plurality of candidate scenes for the n-th scene among a plurality of scenes of the image material. For example, the candidate scene selection unit 140 extracts a specific number of automatic editing results in the descending order of recommendation level among a plurality of patterns of automatic editing results, and selects the respective n-th scenes in the specific number of automatic editing results and make them the candidate scenes. As described, by selecting the candidate scene according to the recommendation level, an appropriate candidate scene can be presented in consideration of the features of the scenes of the entire edit result or the relationship between the scenes.

Furthermore, the candidate scene selection unit 140 may also select the candidate scene based not only on the feature of each scene described above but also on the user preference information (information indicating the result of past selection by a user) stored in the user preference database 320. The user preference information is updated based on the result of past selection by a user. Every time a candidate scene is selected by a user on the edit screen 1, the edit result production unit 180 described later updates the user preference information based on the selection result. The candidate scene selection unit 140 changes the weight on the recommendation level or on the feature for selecting a candidate scene, according to the user preference information. For example, in case a user frequently selects a scene with a smiling face, the recommendation level described above is calculated with the weight for the feature indicating a smiling face made large. As described, by learning the preference of a user in real time every time a user selects a candidate scene, the preference can be immediately reflected on the selection of the later candidate scenes.

Furthermore, the candidate scene selection unit 140 selects, for each of the selected candidate scenes for the n-th scene, a plurality of candidate scenes that are to be the candidates for the n+1-th scene, based on the feature or the relationship of each scenes. The plurality of candidate scenes for the n+1-th scene are displayed in the next-scene display area 3 on the edit screen 1. The selection process for the candidate scene for the n+1-th scene is the same as for the candidate scene for the n-th scene described above.

As described above, the candidate scene selection unit 140 sequentially selects candidate scenes for the first, second, . . . , m-th scenes of the edited work. When the n-th scene is decided by a user in the scene selection area 2 on the edit screen 1, the candidate scene selection unit 140 selects, as the candidates for the n+1-th scene, candidate scenes that may be suitably linked after the n-th scene.

Furthermore, the candidate scene selection unit 140 selects, based on the feature of each scene of the image material, the first to m-th candidate scenes to be displayed in the roll film area 5 on the edit screen 1. The first to m-th candidate scenes are the most recommended automatic editing result by the automatic editing function. For example, as the method of selecting the first to m-th candidate scenes for the roll film area 5, the method that uses the recommendation level for each scene and the method that uses the recommendation level for the entire automatic editing result can be conceived as in the case described above.

First, the method that uses the recommendation level for each scene will be described. As in the case described above, the candidate scene selection unit 140 repeatedly performs the process of obtaining the recommendation level for each scene as the candidate for the n-th scene on the first to m-th scenes of the edit result. Accordingly, the recommendation levels for the respective scenes as the first to m-th scenes are obtained. Then, the candidate scene selection unit 140 selects, as the candidate scenes for the first to m-th scenes, respective scenes for which the recommendation levels are the highest as the candidates for the first to m-th scenes among a plurality of scenes of the image material. By combining these candidate scenes for the first to m-th scenes that were selected in this manner, the most recommended automatic editing result can be produced and its thumbnail images 50 can be displayed in the roll film area 5.

Next, the method that uses the recommendation level for the entire automatic editing result will be described. The candidate scene selection unit 140 performs the automatic editing process as in the case described above, creates a plurality of patterns of automatic editing result, and obtains the recommendation level for each of the automatic editing results. Then, the candidate scene selection unit 140 selects, among a plurality of scenes of an image material, the candidate scenes for the first to m-th scenes that make up the most recommended automatic editing result. The thumbnail images 50 of such candidate scenes for the first to m-th scenes are displayed in the roll film area 5 on the edit screen 1.

Furthermore, when the selection for the candidate scene 20 for the n-th scene is changed (the cursor 21 is moved) in the scene selection area 2 on the edit screen 1, the candidate scene selection unit 140 reselects, based on the recommendation level described above, each of the candidate scenes for the n+1-th to m-th scenes to be arranged after the candidate scene 20 for the n-th scene after the selection change. More particularly, the candidate scene selection unit 140 selects, as the candidate for the n+1-th scene that is to be linked after the candidate scene 20 for the n-th scene after the change, a candidate scene with the highest recommendation level, and selects, as the candidate for the n+2-th scene that is to be linked next, a candidate scene with the highest recommendation level. By repeating such process, the candidate scenes for the n+1-th to m-th scenes corresponding to the candidate scene 20 for the n-th scene after the selection change are respectively reselected. This enables to dynamically change the display of the thumbnail images 50 in the roll film area 5 in accordance with the selection change for the candidate scene 20 in the scene selection area 2.

As described above, the candidate scene selection unit 140 has the automatic editing function for an image material. Here, the candidate scene selection unit 140 selects a plurality of candidate scenes as the candidates for each scene of the edit result. The candidate scenes selected by the candidate scene selection unit 140 are displayed in the scene selection area 2, the next-scene display area 3, the preview area 4, and the roll film area 5 on the edit screen 1 as appropriate.

The switching effect selection unit 150 selects, based on the features of the candidate scenes selected by the candidate scene selection unit 140, candidates for the image switching effect to be applied between the candidate scenes among a plurality of image switching effects that are set in advance. The image switching effect is also referred to as an effect, and is an image effect to be applied on the connecting portion of two moving images, and it may be "Cut," "FadeIn (B),"

"Still," "Wipe," "Dissolve," "Insertion (W)," or the like, for example. By selecting, by the switching effect selection unit 150, appropriate candidates for the image switching effect to be applied between candidate scenes in accordance with the features of the candidate scenes, the candidates for the image switching effect can be displayed by a selection menu 27 (refer to FIG. 11) on the edit screen 1 described later. This enables a user to select a desired image switching effect among appropriate candidates for the image switching effect from the selection menu 27 on the edit screen 1.

The edit screen creation unit 160 reads out the image data of the candidate scenes selected by the candidate scene selection unit 140 described above from the material group database 300, and creates the edit screen 1 as shown in FIG. 1.

The display control unit 170 controls the display unit 172, and makes the display unit 172 display the edit screen 1 created by the edit screen creation unit 160. The display unit 172 is a monitor device such as an LCD or the like, and displays the edit screen 1 under the control of the display control unit 170.

The edit result production unit 180 adjusts, based on the use r operation on the input unit 182, the edit result that has been automatically edited by the candidate scene selection unit 140 described above, and produces a final edit result (edited work). That is, the edit result production unit 180 produces the final edit result (edited work) by combining the candidate scenes for the first to m-th scenes that are sequentially selected by a user among a plurality of candidate scenes that are displayed in the scene selection area 2 on the edit screen 1.

As shown in FIG. 1, the candidate scenes 20 for the n-th scene of the edit result are displayed in the scene selection area 2 on the edit screen 1. When a user selects a desired scene from the candidate scenes in the scene selection area 2, the candidate scenes for the n+1-th scene will be displayed in the scene selection area 2 next. By repeating such user selection, m scenes (first, second, . . . , m-th scenes) that make up the edit result are decided sequentially from the beginning.

The edit result production unit 180 connects the m scenes that are selected by the user in the manner described above in the order of selection, produces an edit result (edited work) that is obtained by editing an image material, and stores information relating to the edit result in the edit result database 330. The information to be stored relating to the edit result may be the image data itself of the edit result or may be identification information of a plurality of scenes that make up the edit result.

Furthermore, the edit result production unit 180 determines one image switching effect that is selected by the user as the image switching effect to be applied between scenes, among a plurality of candidates for the image switching effect that are displayed in the selection menu 27 (refer to FIG. 11) on the edit screen 1. The plurality of candidates for the image switching effect in the selection menu 27 are the image switching effects that may be suitably applied between the scenes, the plurality of candidates being selected by the switching effect selection unit 150. Such image switching effects are also sequentially determined from the connection of the first two scenes of the edit result by the same process as for the candidate scenes described above. The edit result production unit 180 stores the information relating to the image switching effect to be applied between scenes that is determined in this manner in the edit result database 330.

Additionally, the input unit 182 may be a touch panel that is overlappingly arranged on the display unit 172 that displays the edit screen 1, or it may be a mouse, a keyboard, or the like. In case the input unit 182 is a touch panel, a user selects a desired candidate scene or a desired image switching effect by tapping on the edit screen 1. Also, in case the input unit 182 is a mouse, a user moves a mouse pointer that is displayed on the edit screen 1 and selects a desired candidate scene or a desired image switching effect.

<5. Image Editing Method>

Figure 5:
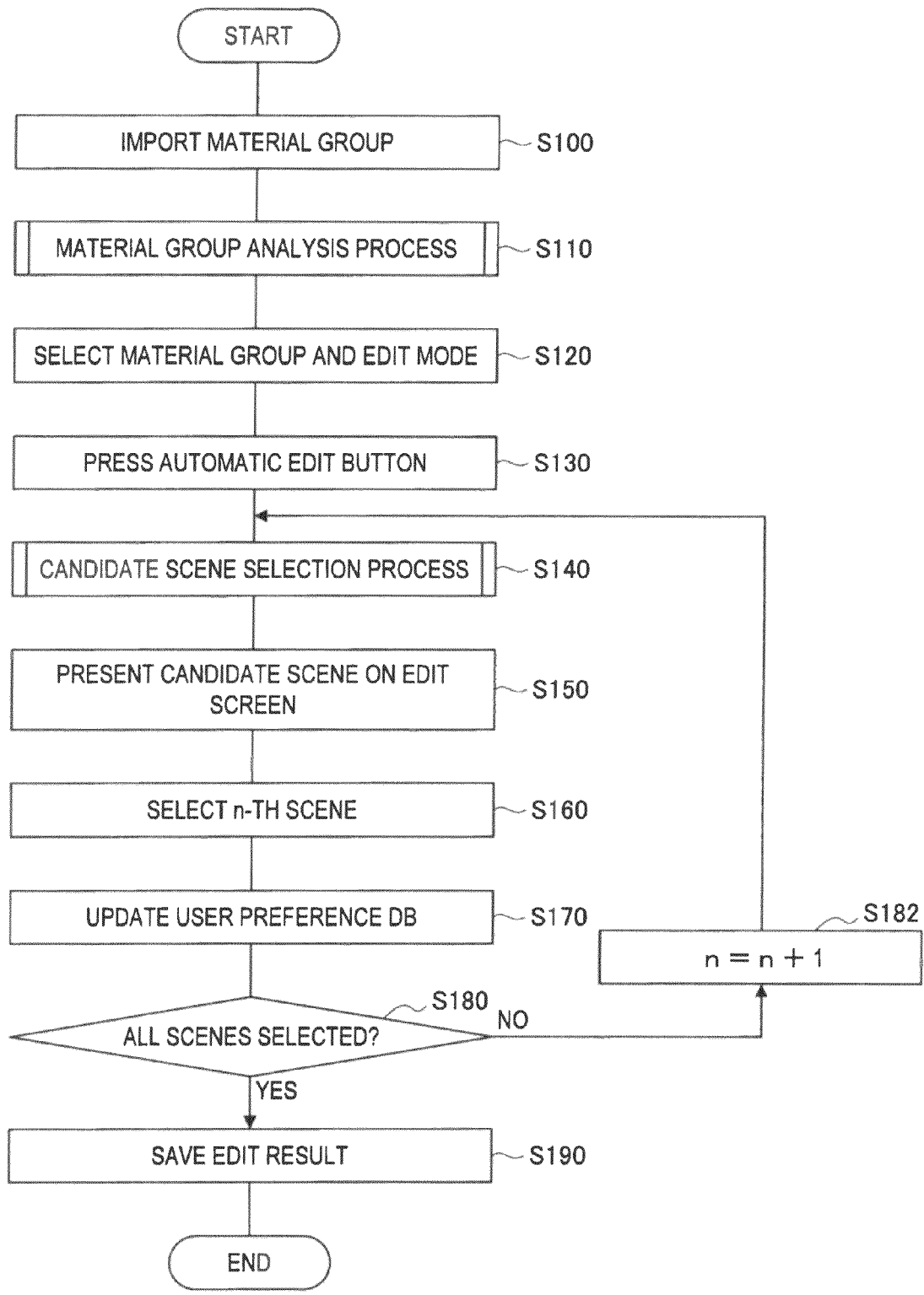
FIG. 5 is a flow chart showing an image editing method that uses an image editing apparatus according to an exemplary embodiment.

Next, an image editing method that uses the image editing apparatus 100 according to the present exemplary embodiment will be described with reference to FIG. 5. FIG. 5 is a flow chart showing an image editing method that uses the image editing apparatus 100 according to the present exemplary embodiment.

As shown in FIG. 5, the image editing apparatus 100 first imports an edit material group, such as moving images, still images, sound, or the like, into the apparatus (S100). The image editing apparatus 100 acquires an edit material from an external device via the network 214 or a removable recording medium, and stores the same in the material group DB 300.

Figure 6:
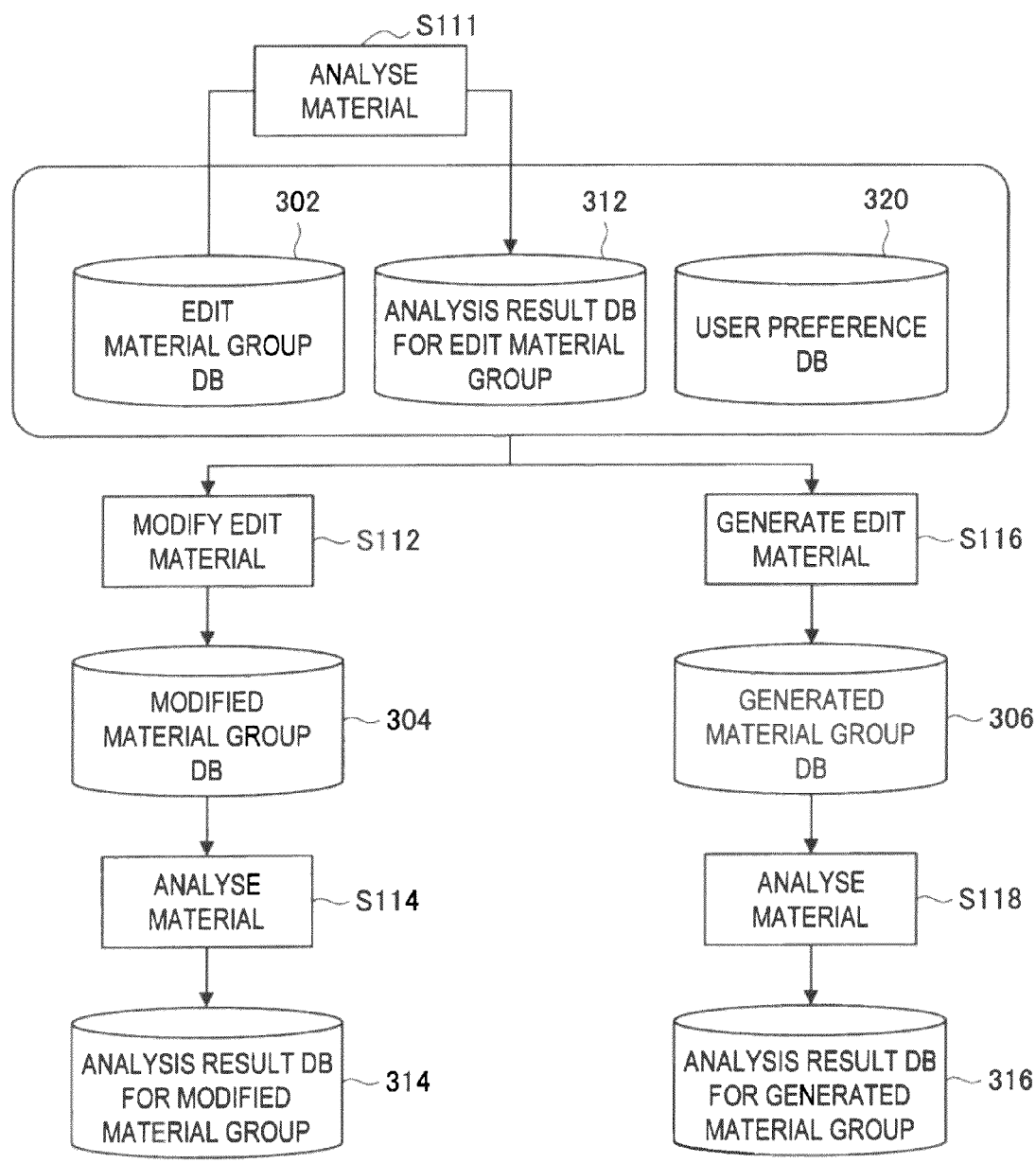
FIG. 6 is a conceptual diagram showing an example of an analysis process of an edit material group according to an exemplary embodiment.

Next, the image editing apparatus 100 analyses the image material group, and stores the analysis result in the analysis result DB 310 (S110). Here, the analysis process of the edit material group (S110) will be described in detail with reference to FIG. 6. FIG. 6 is a conceptual diagram showing an example of the analysis process of the edit material group according to the present exemplary embodiment.

As shown in FIG. 6, the image editing apparatus 100 first analyses a moving image, a still image, sound, or the like, of an edit material stored in an edit material group DB 302, and stores the analysis result in an analysis result DB 312 for an edit material group (S111). The analysis result of the edit material group may include the features of the image material shown in FIG. 4.

Next, the image editing apparatus 100 determines an edit material that can be modified based on the analysis result (feature) of the edit material group, modifies the image material, and generates a modified material (S112). The material modification process includes a hand-blur compensation process (moving image), a blur compensation process (still image), an environmental sound removing process (sound), and the like, for example. The modified material generated by the material modification process is stored in a modified material group DB 304.

Furthermore, the image editing apparatus 100 analyses a moving image, a still image, sound, or the like, of the modified material stored in the modified material group DB 304, and stores the analysis result in an analysis result DB 314 for a modified material group (S114). The analysis result of the modified material group also includes, for example, the features of the image material shown in FIG. 4.

On the other hand, the image editing apparatus 100 newly generates an edit material (hereinafter "generated material") that is more suitable to be edited from the edit material based on the analysis result of the edit material group (feature) stored in the analysis result DB 312 and user preference information stored in the user preference DB 320 (S116). The material generation process includes a subject-tracking and cropping processes (moving image), a slow motion process (moving image), a still image extraction process (moving image), a high definition process (still image), an illustration process (still image), a vocal emphasis process (sound), and the like, for example. The generated material generated by the material generation process is stored in a generated material group DB 306.

Furthermore, the image editing apparatus 100 analyses a moving image, a still image, sound, or the like, of the generated material stored in the generated material group DB 306, and stores the analysis result in an analysis result DB 316 for a generated material group (S118). The analysis result of the generated material group also includes, for example, the features of the image material shown in FIG. 4.

By preparing a material in the manner described above, a modified material obtained by modifying an edit material or a generated material newly generated from an edit material can also be made an image material that is an edit target. Furthermore, not only the raw data of the edit material but also the modified material and the generated material are analysed, and the features of these materials are obtained from the analysis results. This enables the inclusion of the modified material and the generated material as the candidate scenes, and thus an edit result with higher quality and that is to the liking of a user can be produced.

We return to FIG. 5 to continue with the description. After step S110 described above, the image editing apparatus 100 selects an image material that is the edit target from the image materials stored in the material group DB 300 of the image editing apparatus 100 and selects an edit mode, based on a user input (S120). The edit mode is a form of automatic editing using the edit screen 1, and includes a "story-based mode," a "music-driven mode," a "scene drop mode," and the like, for example. The story-based mode is an edit mode for arranging scenes of a moving image into a story, making it easy to view. The music-driven mode is an edit mode for selecting scenes in accordance with the BGM such as music. The scene drop mode is an edit mode for determining a scene to be deleted among a plurality of scenes in a moving image. With the image material that is the edit target and the edit mode set by a user, the image material can be automatically edited by the desired form of editing. Additionally, this step S120 can be omitted by setting the edit mode in advance.

Figure 7:
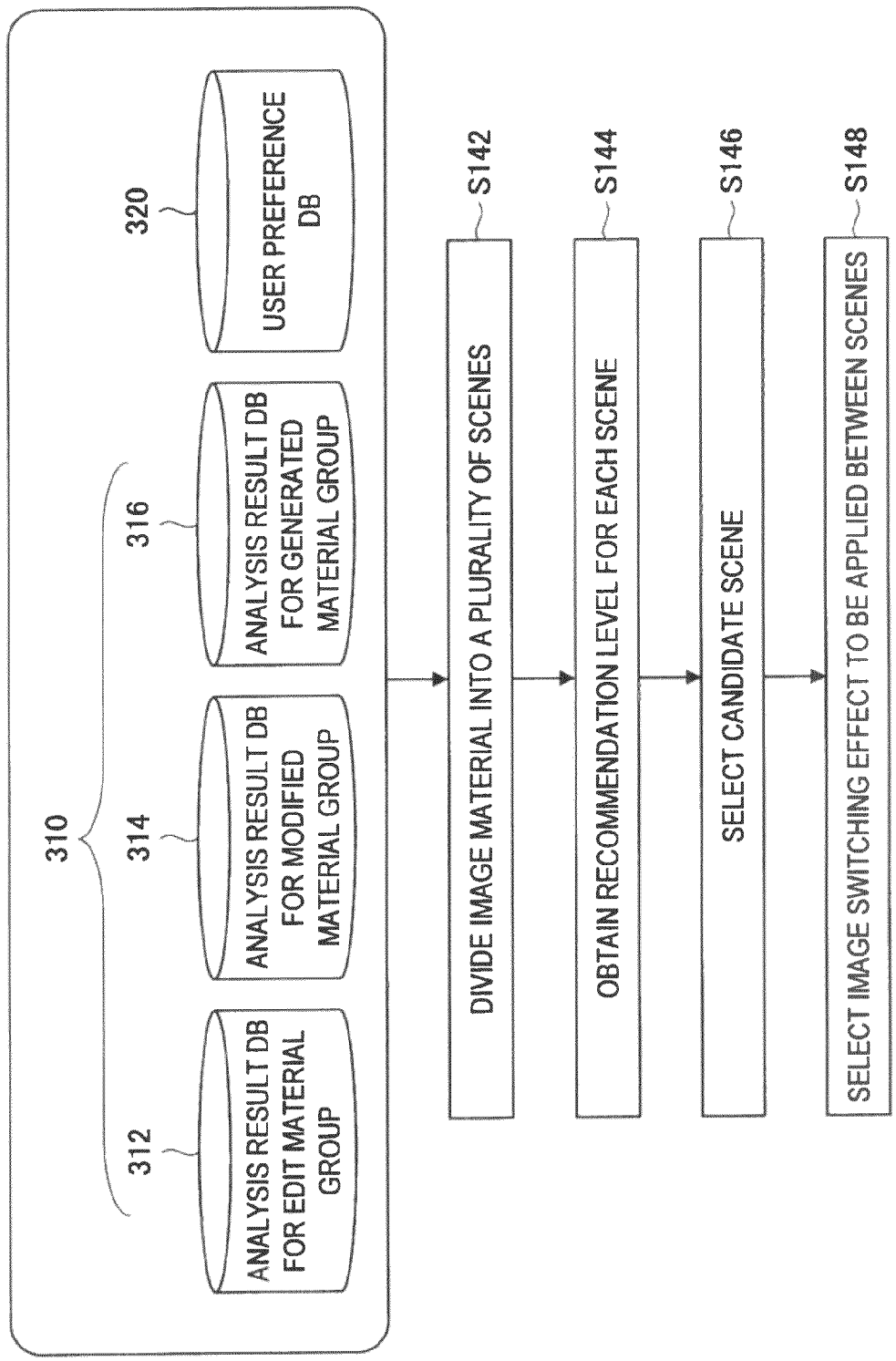
FIG. 7 is a conceptual diagram showing an example of a selection process for a candidate scene according to an exemplary embodiment.

Then, when the user instructs the image editing apparatus 100 to perform automatic editing by, for example, pressing an automatic edit button (S130), the image editing apparatus 100 automatically edits the image material, and selects the candidate scenes (S140). A selection process for a candidate scene (S140) will be described here in detail with reference to FIG. 7. FIG. 7 is a conceptual diagram showing an example of the selection process for a candidate scene according to the present exemplary embodiment.

As shown in FIG. 7, the image editing apparatus 100 automatically edits various kinds of material groups by using the DB group 310, which includes analysis result DBs 312, 314 and 316 for various kinds of material groups and the user preference DB 320, and selects candidate scenes for each scene making up the edit result and the candidates for the image switching effect to be applied between scenes. The analysis results of various kinds of material groups include the analysis results of the edit material group, the modified material group and the generated material group described above. The analysis result DBs 312, 314 and 316 are included in the material group DB 300 shown in FIG. 3.

First, the image editing apparatus 100 divides a moving image, among the image material that is the edit target selected in S120, into a plurality of scenes (S142). More particularly, the image editing apparatus 100 determines a dividing position of scenes included in the moving image based on the values of various kinds of features included in the analysis results and the changes in these features along the time axis, and divides the moving image into a plurality of scenes. The feature, for example, is the operation of the camera (zooming, panning, tilting, or the like), the presence or absence of the subject in the moving image, the movement of the subject, the presence/absence of a part (for example, the face, the body) of the subject (person), the expression (a smile) of the subject or words spoken by the subject, the presence or absence or the tempo of sound (music, environmental sound, speaking voice, or the like), the presence or absence of a failed image due to a hand blur or out-of-focusness, or the like, shown in FIG. 4.

Next, the image editing apparatus 100 obtains the recommendation level for an image material based on the feature of an image material, such as each scene of a moving image obtained in S142, a still image, or the like (S144). More particularly, the image editing apparatus 100 first selects, from a plurality of types of features, a plurality of features that are suitable for the edit mode selected in S120, and weights the selected features according to the user preference information in the user preference DB 320. The features obtained as a result will be a basis for calculating the recommendation level for each scene in the moving image. Next, the image editing apparatus 100 quantifies the recommendation level for each image material based on the feature of each scene of the image material included in the analysis result in the analysis result DB 310 and based on the relationship between the features of the scenes.

A concrete example of quantification of the recommendation level will be described. The recommendation level for each scene obtained by dividing the moving image is obtained from the feature of the scene. For example, faces of people appearing in the moving image are detected and identified, and based on the appearance time of each person, his/her position in the image, and the like, the importance of each person may be assessed and the recommendation level may be raised for a scene in which a person with high importance appears over a long period of time. Alternatively, the recommendation level may be raised for a scene that enables to grasp the image capturing situation or a scene that enables a panoramic view of the image capturing environment (for example, a scene with a signboard, a scene of a distant view).

The recommendation level may also be obtained from the order of arrangement of each scene of the image material (the relationship between the features of scenes). For example, in case a plurality of scenes having similar features are successively arranged, the recommendation level may be reduced as the scene being tediously lengthy. Alternatively, in case scenes are arranged in reversed order of image capturing time where the edit mode is the story-based mode, the recommendation level may be reduced.

Next, the image editing apparatus 100 selects a plurality of candidate scenes as the candidates for a scene that is currently selected, based on the recommendation level for each scene obtained in S144 (S146). For example, when selecting the n-th scene of the edit result, a specific number (for example, three) of candidate scenes are selected from a plurality of scenes of the moving images or from the still images in the descending order of recommendation levels for the scenes as the n-th scene. The candidate scene is a scene suitable as the scene after the n−1-th scene that is already determined.

Furthermore, the image editing apparatus 100 selects, as the image switching effect to be applied between each scene, candidates for an image switching effect appropriate for the feature, based on the feature of each image material described above (S148). For example, when there is a time gap between two successive scenes, a black image is inserted between the scenes, and the image switching effect "FadeIn (B)" that makes the scenes fade in/fade out is selected. Furthermore, when there is a large difference between the features of the scenes, an image switching effect that make the scenes partially overlap with each other is selected. With the image editing apparatus 100 selecting candidates for the image switching effect to be applied between each scene, a user can determine a desired image switching effect from the candidates. Additionally, the image editing apparatus 100 may also automatically select the optimum image switching effect to be applied between each scene.

According to the candidate scene selection process S140 as described above, a plurality of candidate scenes that may be suitably linked after a preceding scene are automatically extracted from a plurality of image materials (scenes of a moving image, still images) and candidates for the image switching effect to be applied between each scene are also selected, based on the features of the image materials.

We return to FIG. 5 to describe the processes following S140. The image editing apparatus 100 displays the edit screen 1 (refer to FIG. 1) for presenting, to the user, the plurality of candidate scenes selected in S140 (S150). As shown in FIG. 1, a plurality of candidate scenes 20A to 20C that are suitable as the candidate for the n-th scene that is selected are displayed in the scene selection area 2 on the edit screen 1. Also, a plurality of candidate scenes 30A to 30C, 30D to 30F, and 30G to 30I for the n+1-th scene are displayed in the next-scene display area 3 respectively for the candidate scenes 20A to 20C. Furthermore, a high-speed playback moving image 41 is displayed in the preview area 4 for checking the continuity between the scene that is selected and the scenes before and after the scene. Also, the thumbnail images 50A to 50E showing the overall picture of the edit result that is most recommended by the automatic editing are displayed in the roll film area 5.

The user looks at this edit screen 1, grasps the contents of the candidate scenes and the contexts before and after the scene, and selects a scene that is to the user's liking from the plurality of candidate scenes 20A to 20C presented in the scene selection area 2 (S160). The user selects the desired scene by moving the cursor 21 up and down by pressing the up/down buttons 22A and 22B adjacent to the cursor 21, setting the cursor 21 to a desired candidate scene 20, and pressing a determination button (not shown). The n-th scene of the edit result is decided by such user selection.

Next, the image editing apparatus 100 updates the user preference DB 320 based on the result of the user selection in S160 (S170). This enables to store the history of the user selection results in the past in the user preference DB 320. The image editing apparatus 100 updates the user preference information in the user preference DB 320 according to the feature of the candidate scene that the user selected in S160. For example, when the user selected a scene with a smile, the user preference information is updated such that the weight on a feature relating to a smile is large at the time of calculating the recommendation level in S140 described above. This enables to reflect the user selection results in the past from the next time the candidate scenes are to be selected in S140.

Next, the image editing apparatus 100 decides whether all the scenes (first to m-th scenes) of the edit result are selected by the user or not (S180). In the case not all the scenes are selected, n is incremented by 1 (S182), and the process by the image editing apparatus 100 returns to S140. Then, as in the same manner as above, the image editing apparatus 100 selects a plurality of candidate scenes for the next scene (n+1-th scene) (S140), presents the candidate scenes on the edit screen 1 (S150), and determines the candidate scene selected by the user on the edit screen 1 as the n+1-th scene (S160). By sequentially repeating such selection process for candidate scenes, all the scenes (first to m-th scenes) will be determined sequentially from the first scene of the edit result.

Then, the image editing apparatus 100 combines the images of the first to m-th scenes sequentially selected by the user in the manner described above, produces a final edit result (edited work), and stores the same in the edit result DB 330 (S190).

<6. Application Example>

Next, an application example of the image editing method that uses the edit screen 1 according to the present exemplary embodiment will be described.

(1) Editing According to Edit Mode

First, the image editing method in accordance with the edit mode according to the present exemplary embodiment will be described with reference to FIGS. 8 to 10.

The image editing apparatus 100 according to the present exemplary embodiment can present various edit modes according to the purpose of the user. As described above, as the edit mode, there are the story-based mode, which is for arranging scenes of a moving image into a story, making it easy to view, the music-driven mode, which is for selecting scenes in accordance with the BGM such as music, the scene drop mode, which is for determining a scene to be deleted among a plurality of scenes in a moving image, and the like. The user can easily obtain a desired edit result by setting a desired edit mode according to the purpose.

Figure 8:
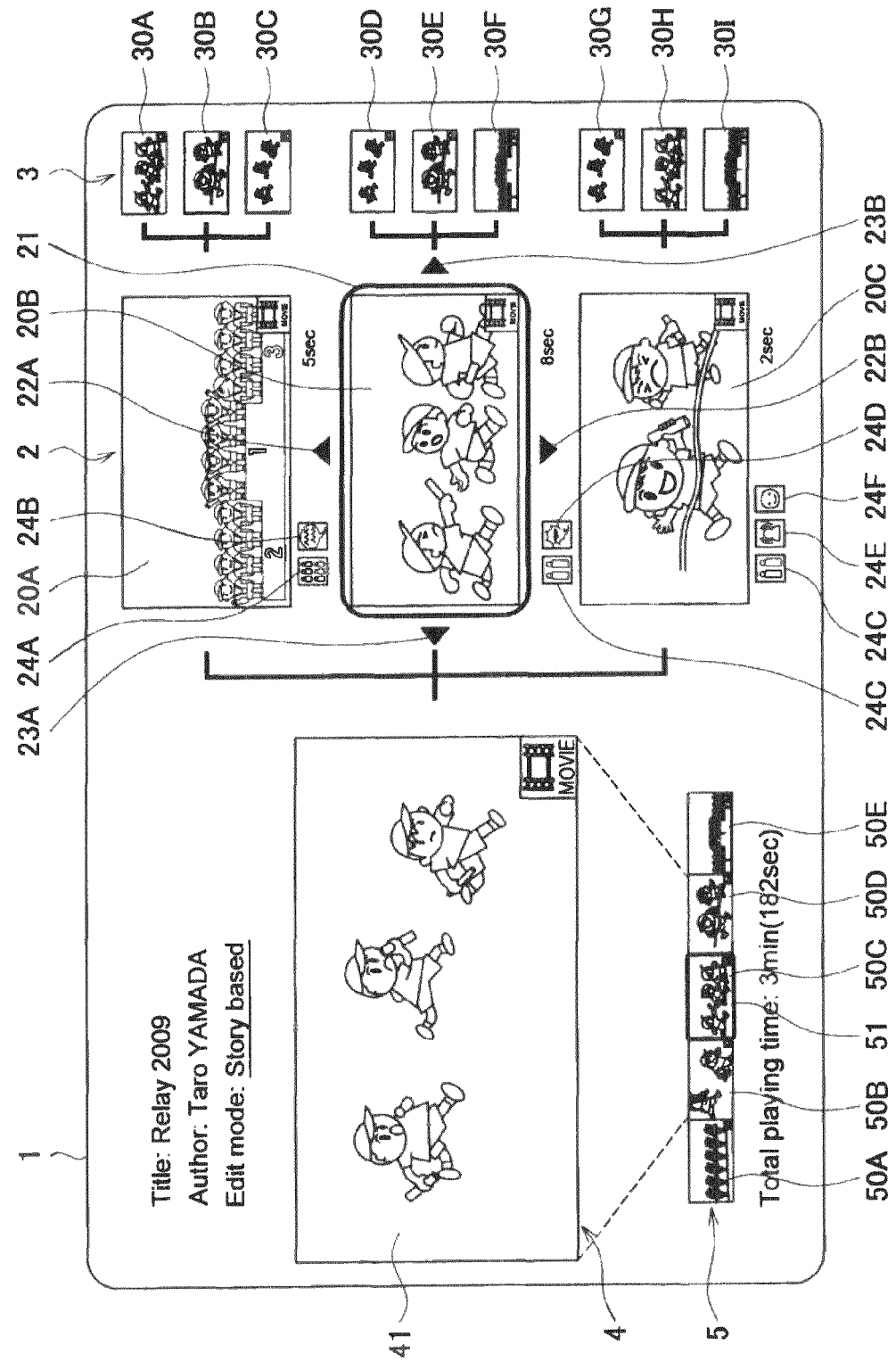
FIG. 8 is a diagram showing an example of display of an edit screen in accordance with a story-based edit mode according to an exemplary embodiment.

FIG. 8 is an example of display of the edit screen 1 in case of editing in the story-based mode. In the story-based mode, an edit result with a story line is obtained by deleting unnecessary scenes from one or more image materials and chronologically connecting scenes that are necessary. The unnecessary scenes are a failed scene with hand blur or which is out of focus, a scene in which a desired subject does not make appearance, an unlively scene, a tediously lengthy scene, and the like. The scenes that are necessary are a scene in which a desired subject appears, a scene with a smile, a lively scene, a scene with a conversation, a highlight scene, a digest scene, and the like. In the story-based mode, candidate scenes made up of the scenes that are necessary are presented in the scene selection area 2 on the edit screen 1 basically in a chronological order. Accordingly, a user can easily obtain a desired edit result with a story line by sequentially selecting a candidate scene presented on the edit screen 1.

Figure 9:
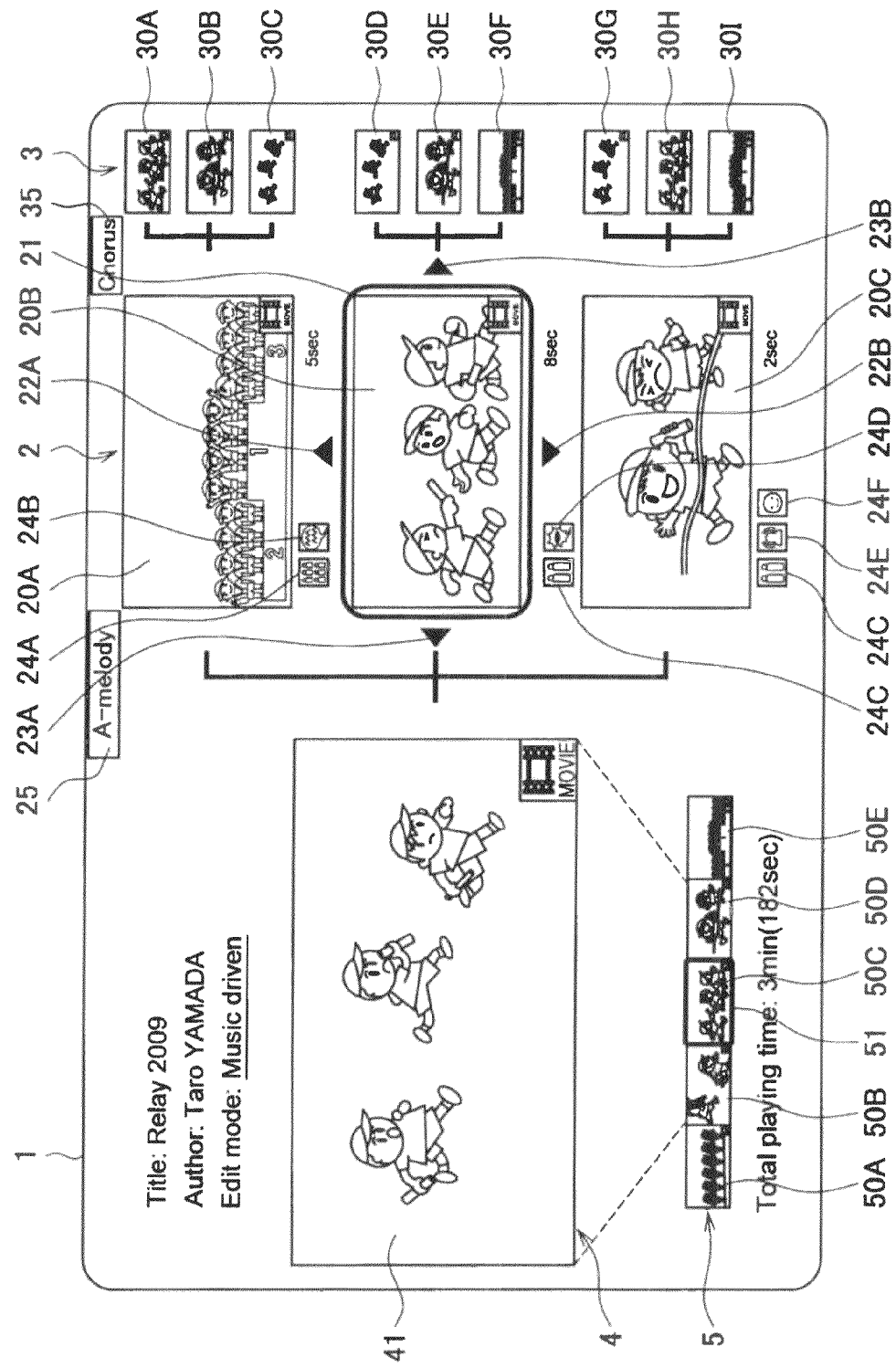
FIG. 9 is a diagram showing an example of display of an edit screen in accordance with a music-driven edit mode according to an exemplary embodiment.

FIG. 9 is an example of display of the edit screen 1 in case of editing in the music-driven mode. In the music-driven mode, an edit result is obtained by connecting scenes matching the music played as BGM. A specific part in a music piece (for example, a chorus, an A melody, a B melody, and the like) can be specified by a known 12 tone analysis technology, and thus, in the music-driven mode, a scene of an image can be displayed in association with a part of a music piece. For example, a highlight scene may be associated with the chorus part of a music piece, and a peaceful scene may be associated with the A melody part. Icons 25 and 35 indicating the part of the music piece are displayed on the edit screen 1 of FIG. 9 to present to a user which part of the music piece the scene that is currently selected is associated with. The icon 25 indicates that the n-th scene that is currently selected in the scene selection area 2 corresponds to the A melody part of the music piece, and the icon 35 indicates that the n+1-th scenes displayed in the next-scene display area 3 correspond to the chorus part of the music piece. This allows the user to select on the edit screen 1 a candidate scene 20 that matches the chorus part or the like of a music piece.

Figure 10:
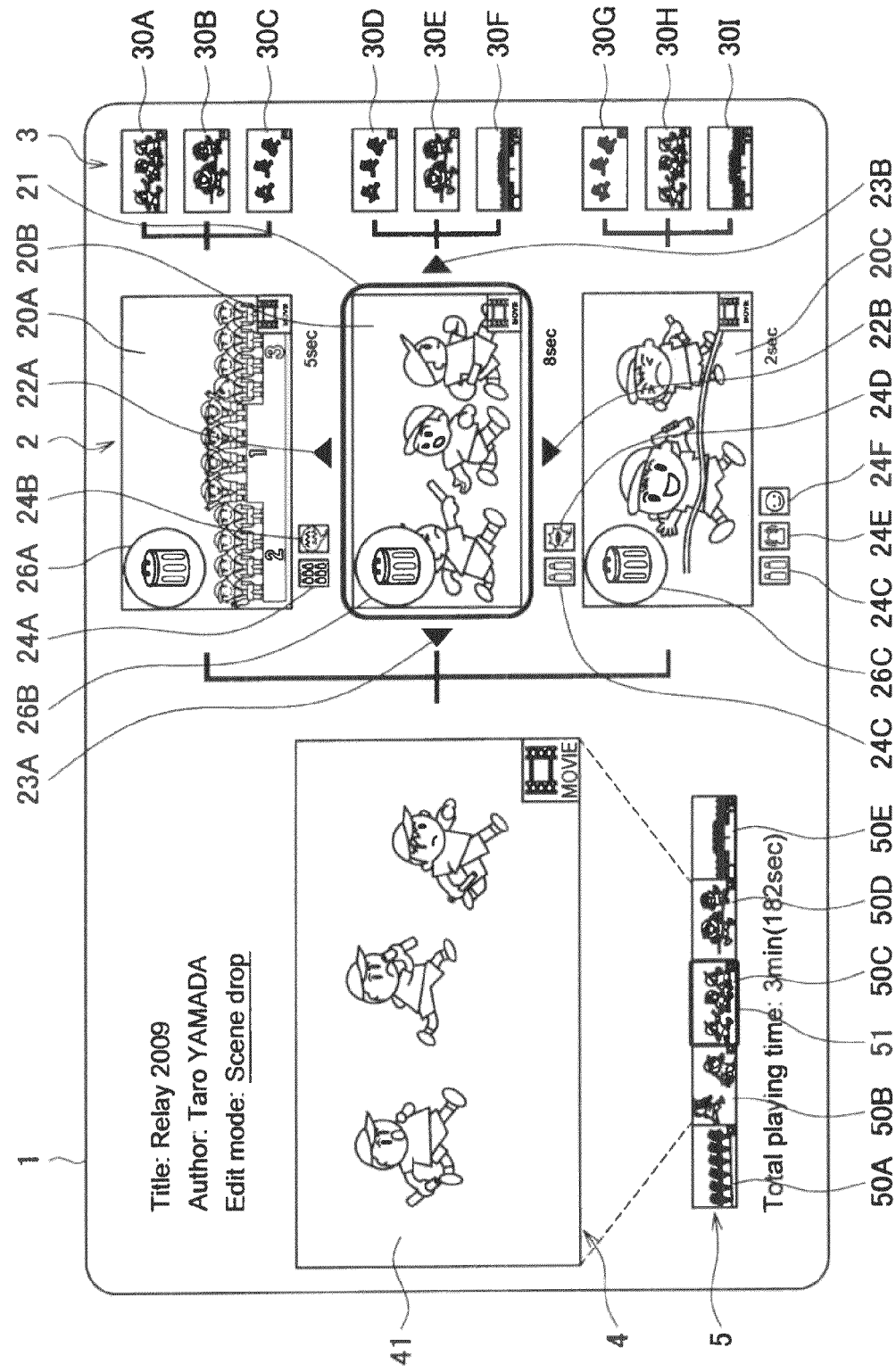
FIG. 10 is a diagram showing an example of display of an edit screen in accordance with scene drop edit mode according to an exemplary embodiment.

FIG. 10 is an example of display of the edit screen 1 in case of editing in the scene drop mode. In the scene drop mode, an edit result configured from scenes that are necessary can be obtained by deleting unnecessary scene by using a delete icon 26 displayed in the scene selection area 2 on the edit screen 1. As shown in FIG. 10, delete icons 26A to 26C are displayed on respective candidate scenes 20 that are displayed in the scene selection area 2 on the edit screen 1. A user can delete the candidate scene 20A corresponding to the delete icon 26A by selecting the delete icon 26A on the edit screen 1. In the case a user selects one candidate scene 20 at the time of selecting the n-th scene without selecting any of the delete icons 26, the process proceeds to the selection of the next n+1-th scene with none of the candidate scenes 20A to 20C deleted.

As described above, the preview area 4 on the edit screen 1 displays the high-speed playback moving image 41 showing the selected scene and the scenes before and after the selected scene. Accordingly, by deleting an unnecessary scene by using the delete icon 26 on the edit screen 1, the display of the preview area 4 changes, and a user can check the consequences of deleting the scene on the edit screen 1. There was no GUI in the past that immediately presented to a user the consequences on the overall edit result caused by the deletion of an image material. However, the edit screen 1 according to the present exemplary embodiment is capable of providing such GUI, and the issue of the past can be solved.

(2) Selection of Image Switching Effect

Next, a method of selecting the image switching effect on the edit screen 1 according to the present exemplary embodiment will be described with reference to FIG. 11.

Figure 11:
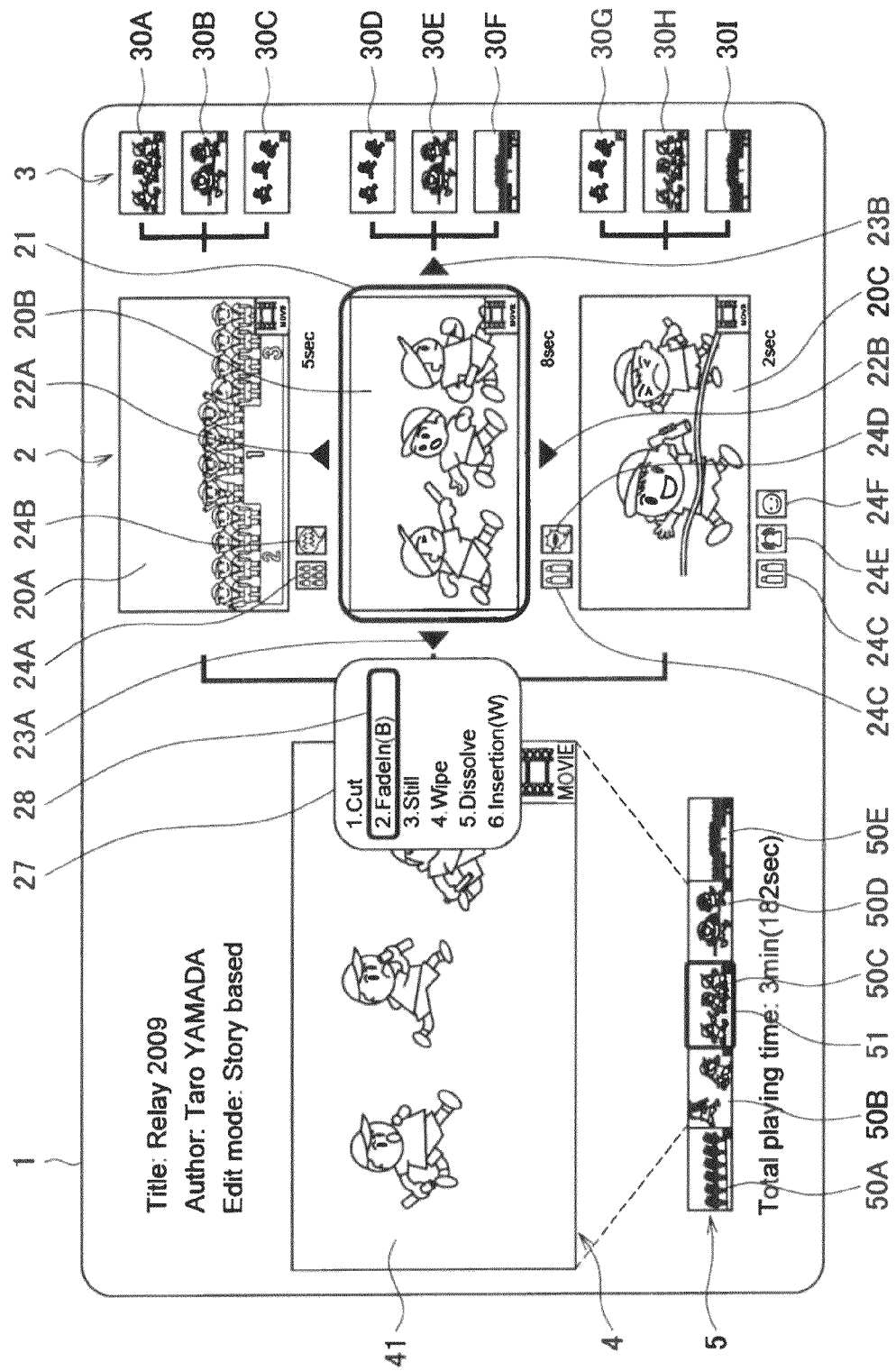
FIG. 11 is a diagram showing an example of display of an edit screen displaying a selection menu according to an exemplary embodiment.

As shown in FIG. 11, when the left button 23A (or the right button 23B) in the scene selection area 2 on the edit screen 1 is pressed, the selection menu 27 for selecting the image switching effect is displayed. The selection menu 27 displays, in the descending order of recommendation level, candidates for the image switching effect to be applied between the candidate scene 20B for the n-th scene that is selected and the candidate scene for the preceding or following scenes (n−1-th or n+1-th). In the example of FIG. 11, six image switching effects are presented in the selection menu 27 in the descending order of recommendation level from the top, and it can be seen that "Cut" is the most recommended image switching effect. These candidates for the image switching effect are automatically selected based on the features of the candidate scenes, and are appropriate image switching effects that are in accordance with the contents or the features of both scenes.

A user can select an image switching effect that is to the user's liking from the appropriate candidates for the image switching effect that are in accordance with the contents or the like of the scenes, by moving a cursor 28 in the selection menu 27. Also, since the image switching effects in the selection menu 27 are presented in the order of recommendation level, and it is highly convenient at the time of the user selecting an image switching effect. The image editing apparatus 100 determines the one image switching effect selected by the user as the image switching effect to be applied between the scenes, and stores the same in the edit result DB 330.

(3) Insertion of Caption

Next, a method of inserting a caption using the edit screen 1 according to the present exemplary embodiment will be described with reference to FIG. 12.

Figure 12:
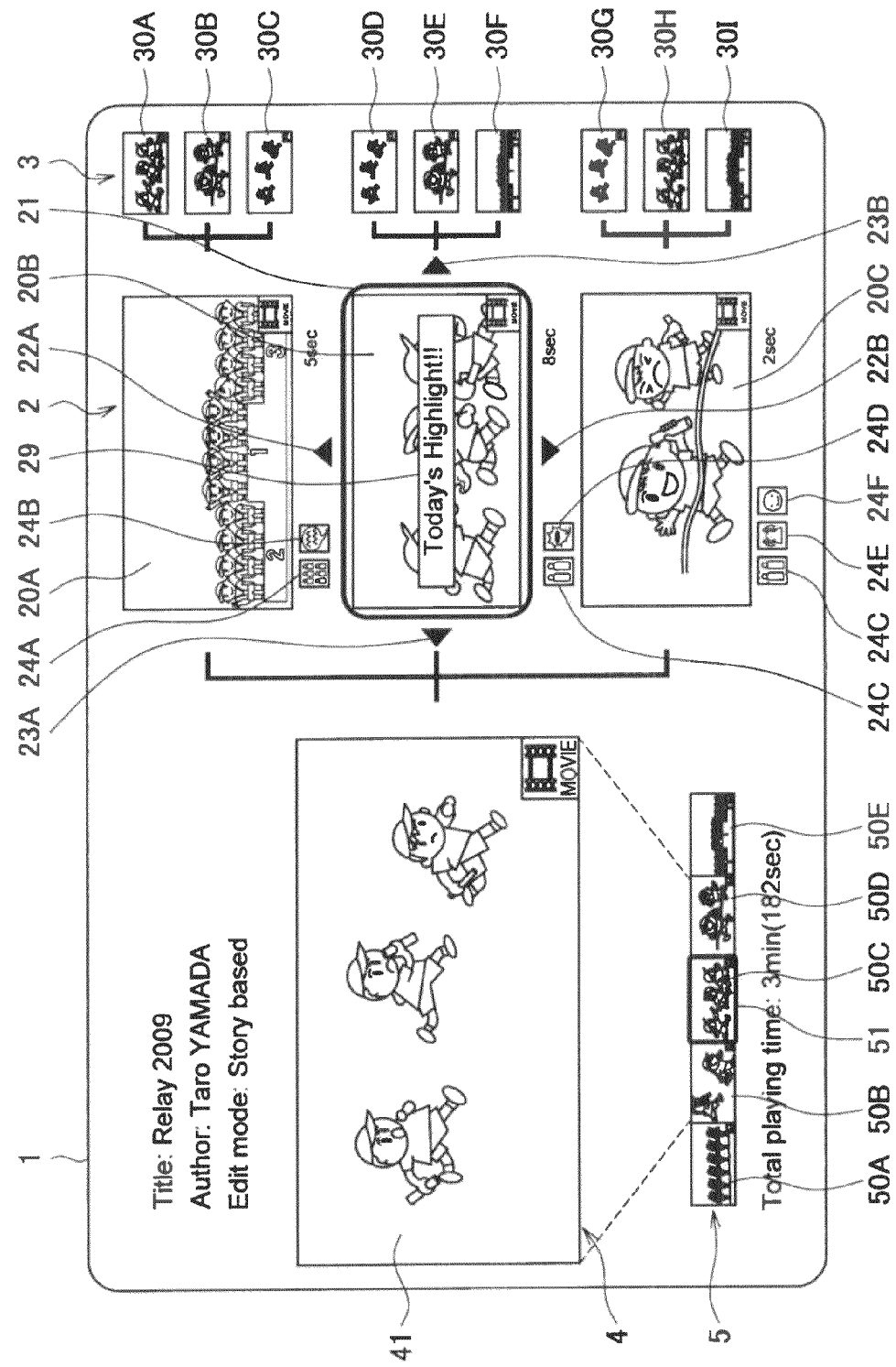
FIG. 12 is a diagram showing an example of display of an edit screen displaying a caption according to an exemplary embodiment.

As shown in FIG. 12, in the scene selection area 2 on the edit screen 1, a caption 29 (text information) can be added to the candidate scene 20 that is selected. According to the edit screen 1 of the present exemplary embodiment, the caption 29 can be easily inserted in the first to m-th scenes making up the edit result in this manner, and the task of editing can be performed efficiently.

<7. Summary>

Heretofore, the image editing apparatus 100 according to the present exemplary embodiment and image editing methods that use the image editing apparatus 100 have been described in detail. According to the present exemplary embodiment, a plurality of candidate scenes 20 that may be suitably linked after the preceding scene are presented in the scene selection area 2 on the edit screen 1. Accordingly, a user is allowed to easily produce an image work that is to the user's liking by sequentially selecting a desired scene from the plurality of candidate scenes 20 presented on the edit screen 1. Accordingly, a plurality of recommended scenes that may be suitably linked after a certain scene can be presented at the time of adjustment of an image work that has been automatically edited, and also, a user is allowed to easily produce an image work that is to the user's liking with a simple operating system.

More particularly, the image editing method that uses the edit screen 1 according to the present exemplary embodiment can provide an extremely simple operating system at the time of manual adjustment of an edit content after the automatic editing of the moving image. That is, a user can easily edit a moving image and produce an image work that is to the user's liking by simply sequentially selecting from the first scene a plurality of candidate scenes presented on the edit screen 1. At this time, the user can elaborate on the desired content by trial and error by appropriately selecting and changing, as many times as the user wants, between the plurality of candidate scenes 20 presented on the scene selection area 2.

Furthermore, since the recommendation level for each image material is obtained based on the analysis result of the image material and an optimum automatic editing result is produced before the manual editing, the image editing apparatus 100 can display the most recommended automatic editing result on the edit screen 1. For example, the images shown side by side along the horizontal line in the middle of the edit screen 1 (the candidate scenes 20B and 30E in FIG. 1), and the thumbnails 50A to 50E in the roll film area 5 are the most recommended automatic editing result according to the automatic editing. With the most recommended edit result presented on the edit screen 1, even the selection of scenes becomes unnecessary as long as the user is satisfied with the edit result.

Furthermore, on the edit screen 1, not only is the candidate scene (n-th) that is currently selected in the scene selection area 2 displayed, but also the candidate scenes for the next scene (n+1-th) are displayed in the next-scene display area 3. Accordingly, the user can check both scenes at the same time. In addition, the playback moving image 41 for the candidate scene that is selected and the candidate scenes for the preceding and following scenes is displayed in the preview area 4 at all times so as to be previewed at high speed. Accordingly, the user can check in an instant the continuity between the candidate scene that is selected and the preceding and following scenes. Also, information (the icon 23) that enables to understand the reason for recommendation of the candidate scene 20 is also shown in the scene selection area 2, and such information helps the user to select a candidate scene 20.

Furthermore, every time the user selects a candidate scene 20 or an image switching effect to be applied between scenes in the scene selection area 2, the image editing apparatus 100 updates the user preference DB 320 by using the selection result. This enables to learn the preference of a user in real time and to immediately reflect the preference on the selection of the later candidate scenes.

Furthermore, it is also possible to generate, as an image material in which a plurality of image materials are mixed, an edit result in which both a moving image and a still image are mixed. Furthermore, the user can easily insert a caption (text information) in the edit result on the edit screen 1. Furthermore, the user can check, on the edit screen 1, not only the plurality of candidate scenes that are used in the edit result (edited work) but also scenes that are not used.

Furthermore, the image editing method according to the present exemplary embodiment is convenient when editing by combining various image materials that include a plurality of moving images, still images, or the like, from different generation sources. Exemplary uses of the image editing method according to the present exemplary embodiment are as follows.

For example, a case is assumed where members of a family went to school on a field day to cheer for the youngest child and where each member captured images of the sports event using an imaging apparatus that was allotted to the member. At this time, it is assumed that the father used a digital camcorder, the mother used a compact digital camera, the elder brother used a single-lens reflex digital camera, and the elder sister used a built-in camera of a mobile phone. Then, it was decided to edit the image materials captured by these imaging apparatuses into one short movie (moving image) as a souvenir of the youngest child's energetic performance on the field day. The task of editing was decided to be performed by the mother unfamiliar with a personal computer instead of the busy father, and the mother decided to use the automatic editing software that could be easily operated by anyone.

Even in such use case, the mother can easily produce one edited work (short movie) in which various image materials are combined by using the image editing apparatus 100 installed with software with the automatic editing function according to the present exemplary embodiment.

It should be understood by those skilled in the art that various modifications, combinations, sub-combinations and alterations may occur depending on design requirements and other factors insofar as they are within the scope of the appended claims or the equivalents thereof.

Figure 13:
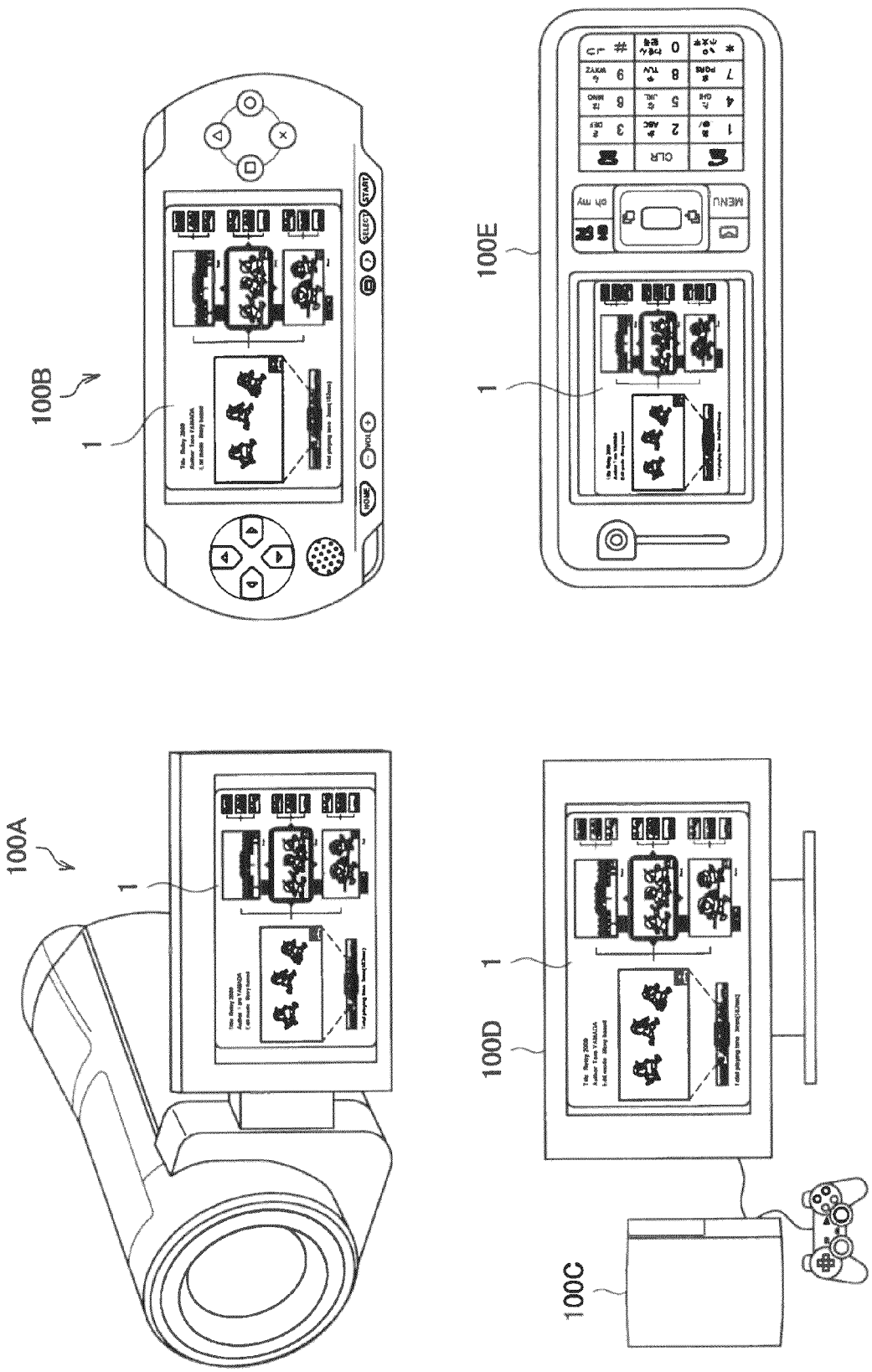
FIG. 13 is a diagram showing image editing apparatuses according to modified examples of the present invention.

For example, although an example has been described for the exemplary embodiment described above where the image editing apparatus is applied to a personal computer, the present invention is not limited to such example. As shown in FIG. 13, the image editing apparatus of the present invention can be applied to a video camera 100A, a portable game machine 100B, a combination of a game machine 100C and a television 100D, a mobile phone 100E, or the like, as long as it is a device capable of displaying the edit screen 1 when the editing application software is installed.

The present application contains subject matter related to that disclosed in Japanese Priority Patent Application JP 2009-176572 filed in the Japan Patent Office on Jul. 29, 2009, the entire content of which is hereby incorporated by reference.

What is claimed is:

1. An information processing apparatus for generating an edited work including a subset of a plurality of scenes in an image material, the information processing apparatus comprising:
a memory configured to store the image material including the plurality of scenes; and
a processor configured
to automatically select, without user input and for an n-th scene of the edited work, a plurality of first candidate scenes from the plurality of scenes based on at least one feature of a preceding (n−1-th) scene of the edited work and features of the plurality of scenes, and
to generate a graphical user interface including a scene selection area and a preview area to be displayed concurrently on a display, wherein the scene selection area includes one or more first candidate images corresponding to at least one of the automatically selected plurality of first candidate scenes, and
the preview area displays a video preview of the preceding (n−1-th) scene.

2. The information processing apparatus according to claim 1, wherein
the processor is configured to determine a different recommendation level for each of the plurality of scenes, and to select the plurality of first candidate scenes from the plurality of scenes based on the different recommendation levels.

3. The information processing apparatus according to claim 2, wherein
the processor is configured to generate the graphical user interface such that the plurality of first candidate scenes are displayed in the scene selection area based on the different recommendation levels of the plurality of first candidate scenes.

4. The information processing apparatus according to claim 1, wherein
the preview area displays the video preview of the preceding (n−1-th) scene and displays a selected one of the plurality of first candidate scenes.

5. The information processing apparatus according to claim 1, wherein
the preview area displays the video preview of the preceding (n−1-th) scene, displays a selected one of the plurality of first candidate scenes, and displays a following (n+1-th) scene selected by the processor.

6. The information processing apparatus according to claim 1, wherein
the processor is configured to generate the graphical user interface to include an indicator, in the selection area, that identifies a selected one of the plurality of first candidate scenes based on a user input.

7. The information processing apparatus according to claim 1, wherein
based on the plurality of first candidate scenes, the processor is configured to select, for a following (n+1-th) scene of the edited work, a plurality of second candidate scenes from the plurality of scenes; and
to generate the graphical user interface to include a next scene display area, the next scene display area including one or more second candidate images corresponding to the plurality of second candidate scenes.

8. The information processing apparatus according to claim 1, wherein the processor is configured
to automatically select at least one scene of the edited work following the n-th scene, and
to generate the graphical user interface to include a roll film area, the roll film area including thumbnail images corresponding to at least the n-th scene and the automatically selected at least one scene included in the edited work.

9. The information processing apparatus according to claim 1, wherein
the processor is configured to generate the graphical user interface to include icons, in the selection area, that represent the features of the plurality of first candidate scenes.

10. The information processing apparatus according to claim 1, wherein
the processor is configured to generate the graphical user interface to include an image switching effect selection window, the image switching effect selection window including a list of user selectable image switching effects to be applied to a connection portion between the n-th scene and one of the preceding (n−1-th) or following (n+1-th) scenes of the edited work.

11. The information processing apparatus according to claim 1, wherein
the processor is configured to generate the graphical user interface to include a delete icon for each of the one or more plurality of first candidate scenes, in the selection area, and to delete a corresponding one of the plurality of first candidate scenes in response to receiving a user selection of the delete icon.

12. The information processing apparatus according to claim 1, wherein
the processor is configured to generate the graphical user interface to include a caption entry field corresponding to one of the plurality of first candidate scenes.

13. The information processing apparatus according to claim 1, wherein
the processor is configured to select the plurality of first candidate scenes from the plurality of scenes based on a chronological order of the plurality of scenes occurring after the preceding (n−1-th) scene of the edited work, and to generate the graphical user interface such that the one or more first candidate images included in the scene selection area are displayed according to chronological order.

14. The information processing apparatus according to claim 1, wherein
the processor is configured to select the plurality of first candidate scenes from the plurality of scenes based on a portion of a music piece to be associated with the n-th scene of the edited work.

15. A method of an information processing apparatus for generating an edited work including a subset of a plurality of scenes in an image material, the method comprising:
storing the image material including the plurality of scenes;
automatically selecting, without user input and by a processor of the information processing apparatus, for an n-th scene of the edited work, a plurality of first candidate scenes from the plurality of scenes based on at least one feature of a preceding (n−1-th) scene of the edited work and features of the plurality of scenes; and
generating by the processor of the information processing apparatus, a graphical user interface including a scene selection area and a preview area to be displayed concurrently on a display, wherein
the scene selection area includes one or more first candidate images corresponding to at least one of the automatically selected plurality of first candidate scenes, and
the preview area displays a video preview of the preceding (n−1-th) scene.

16. A non-transitory computer-readable storage medium having embedded therein instructions, which when executed by a processor, perform a method for generating an edited work including a subset of a plurality of scenes in an image material, the method comprising:
storing the image material including the plurality of scenes;
automatically selecting, without user input and for an n-th scene of the edited work, a plurality of first candidate scenes from the plurality of scenes based on at least one feature of a preceding (n−1-th) scene of the edited work and features of the plurality of scenes; and
generating a graphical user interface including a scene selection area and a preview area to be displayed concurrently on a display, wherein
the scene selection area includes one or more first candidate images corresponding to at least one of the automatically selected plurality of first candidate scenes, and
the preview area displays a video preview of the preceding (n−1-th) scene.

17. The information processing apparatus according to claim 4, wherein
the processor is configured to receive a user selection of one of the plurality of first candidate scenes via the graphical user interface, and to display the preview based on the received user selection of the one of the plurality of first candidate scenes.

18. The information processing apparatus according to claim 1, wherein
the scene selection area is configured to concurrently display the first candidate images for at least two of the plurality of first candidate scenes.

19. The information processing apparatus according to claim 1, wherein
the automatic selection is based on recommendation information of each scene of the plurality of scenes.

* * * * *